United States Patent [19]
Wang et al.

[11] Patent Number: 5,343,512
[45] Date of Patent: Aug. 30, 1994

[54] CALL SETUP METHOD FOR USE WITH A NETWORK HAVING MOBILE END USERS

[75] Inventors: Theresa C. Y. Wang, Scottsdale, Ariz.; Raymond J. Leopold, Colorado Springs, Colo.; Steven H. Moritz, Phoenix, Ariz.

[73] Assignee: Motorola, Inc., Schaumburg, Ill.

[21] Appl. No.: 859,206

[22] Filed: Mar. 27, 1992

[51] Int. Cl.⁵ .................. H04M 11/00; H04B 7/185; H04B 1/00; G01S 3/02
[52] U.S. Cl. ............................. 379/59; 379/60; 455/12.1; 455/13.2; 455/33.1; 455/54.1; 342/450; 342/457; 342/458; 340/988; 340/989; 340/991; 340/992; 340/993
[58] Field of Search ................ 379/59, 60; 455/12.1, 455/13.2, 33.1, 33.2, 54.1, 56.1; 342/450, 451, 453, 457, 458; 340/989, 988, 991, 992, 993, 996

[56] References Cited

U.S. PATENT DOCUMENTS

| | | | |
|---|---|---|---|
| 4,475,010 | 10/1984 | Huensch et al. | 455/56.1 |
| 4,491,594 | 1/1985 | Turner | 370/60 |
| 4,491,947 | 1/1985 | Frank | 370/94 |
| 4,494,230 | 1/1985 | Turner | 370/60 |
| 4,512,011 | 4/1985 | Turner | 370/60 |
| 4,551,833 | 11/1985 | Turner | 370/60 |
| 4,561,090 | 12/1985 | Turner | 370/60 |
| 4,611,322 | 9/1986 | Larson et al. | 370/60 |
| 4,672,656 | 6/1987 | Pfeiffer et al. | 455/12.1 |
| 4,677,616 | 6/1987 | Franklin | 370/94 |
| 4,683,584 | 7/1987 | Chang et al. | 379/269 |
| 4,736,364 | 4/1988 | Basso et al. | 370/68.1 |
| 4,776,001 | 10/1988 | Murata et al. | 379/62 |
| 4,856,048 | 8/1989 | Yamamoto et al. | 379/60 |
| 4,876,738 | 10/1989 | Selby | 379/60 |
| 4,881,271 | 11/1989 | Yamauchi et al. | 379/60 |
| 4,907,290 | 3/1990 | Crompton | 455/56.1 |
| 5,043,736 | 8/1991 | Darnell et al. | 342/450 |
| 5,050,234 | 9/1991 | Ohteru | 455/56.1 |
| 5,055,851 | 10/1991 | Sheffer | 455/33.1 |
| 5,081,703 | 1/1992 | Lee | 455/13.2 |
| 5,119,504 | 6/1992 | Durboraw III, | 455/13.2 |
| 5,161,248 | 11/1992 | Bertiger et al. | 455/12.1 |
| 5,187,805 | 2/1993 | Bertiger et al. | 455/33.1 |

FOREIGN PATENT DOCUMENTS

| | | |
|---|---|---|
| 0365885 | 10/1989 | European Pat. Off. . |
| 0467651 | 7/1991 | European Pat. Off. . |
| 0448789 | 11/1990 | Fed. Rep. of Germany . |

*Primary Examiner*—Stephen Chin
*Assistant Examiner*—Vijay Shankar
*Attorney, Agent, or Firm*—Harold C. McGurk; Frederick M. Fliegel; Robert M. Handy

[57] ABSTRACT

A distributed communication network includes switching offices (SOs), moving-orbit satellites, and subscriber information managers (SIMs). A population of mobile units (MUs) communicates through the network. A MU automatically determines its location and communicates with the network so that this information is kept current at a SO serving the MU and at a home SIM for the MU. The terrestrial nodes of the network have information showing which MUs are logged on at any given time. This knowledge is used to block calls to MUs known to be logged off. Calls are setup through cooperation between SOs. When calls are being setup to MUs, call-originating SOs determine appropriate SIMs and obtains the current location of the MUs from those SIMs. This current location corresponds to a call-destination SO with which the originating SO may cooperate in setting up a call.

35 Claims, 19 Drawing Sheets

FIG. 5

NETWORK CALL SETUP MESSAGES

| MESSAGE NAME | MU | SO | OMU | OSO | DSO | DMU | SIM | MINIMUM DATA ELEMENTS |
|---|---|---|---|---|---|---|---|---|
| 502 LOG-ON | O | R₁ | | | | | R₂ | AUTHENTICATION CODE, MU ID, LOCATION, (SO ID) |
| 504 LOG-ON-RESPONSE | R₂ | R₁,O | | | | | O | MU ID, FEATURES, VALID |
| 506 LOCATION-UPDATE | O | R₁ | | | | | R₂ | MU ID, LOCATION |
| 508 INCOMING-CALL | | | | | O | R | | DMU ID |
| 510 UNIT-FOUND | | | | R₂ | R₁ | O | | DMU ID |
| 512 KILL-CALL | | | O,R | O,R | O,R | O,R | | MU ID, DESTINATION ID |
| 514 OFF-HOOK | | | | R₂ | R₁ | O | | DMU ID |
| 516 CALL-CONNECTED | | | R₂ | R | O | R | | DMU ID, TRAFFIC CHANNEL PARAMETERS TO DMU ID |
| 518 OUTGOING-CALL | | | O | R | | | | OMU ID, DESTINATION ID |
| 520 LOG-OFF | O | R₁ | | | | | R₂ | MU ID |
| 522 LOCATE-UNIT | | | | O | R | | | OSO ID, DESTINATION ID |
| 524 RING | | | | O | | R | R | DMU ID, OSO ID |
| 526 RING-FAILURE | | | | R | O | | | DMU ID, FAILURE TYPE |
| 528 LOCATE-UNIT-RESPONSE | | | | R | | | O | DMU ID, LOCATION, ACTIVE |

LEGEND

MU = MOBILE UNIT
OMU = ORIGINATING MOBILE UNIT
DMU = DESTINATION MOBILE UNIT
SIM = SUBSCRIBER INFORMATION MANAGER

SO = SWITCHING OFFICE
OSO = ORIGINATING SWITCHING OFFICE
DSO = DESTINATION SWITCHING OFFICE
O = ORIGINATION OF MESSAGE
R = RECEIVER OF MESSAGE

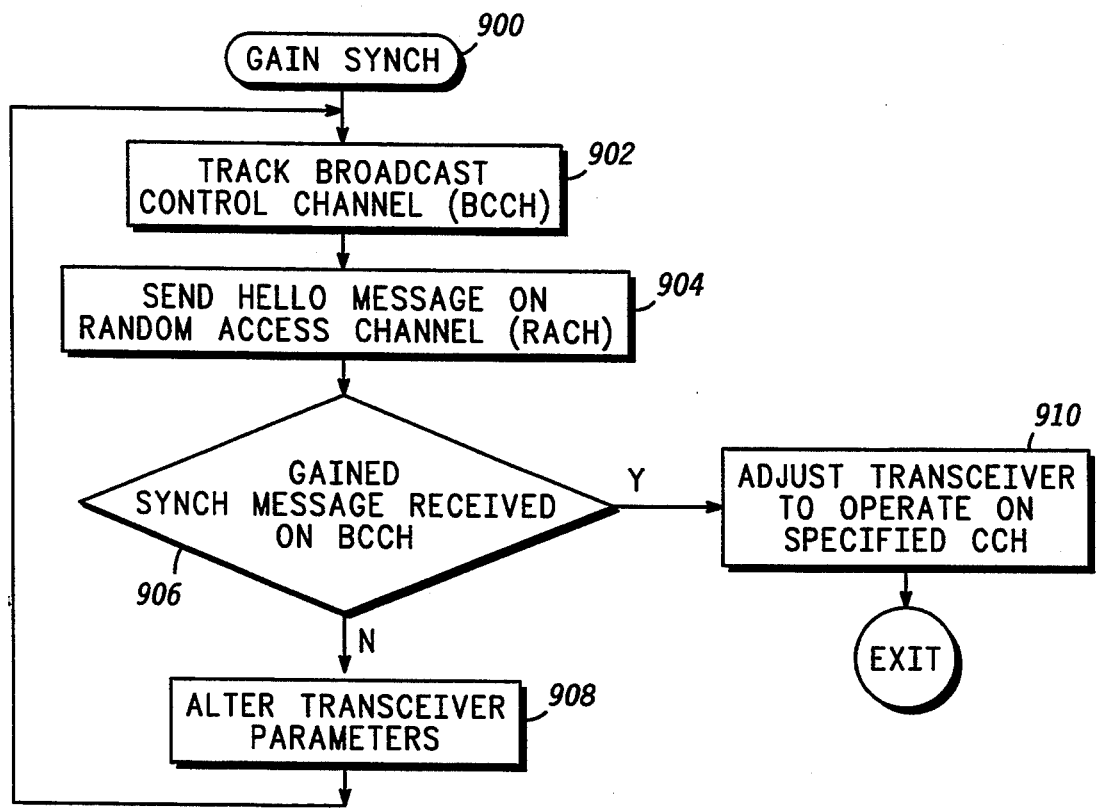
FIG. 9
FIG. 14
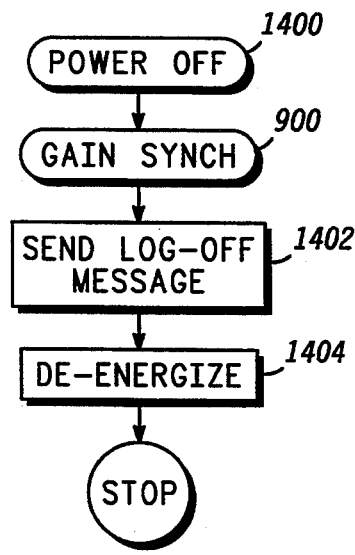

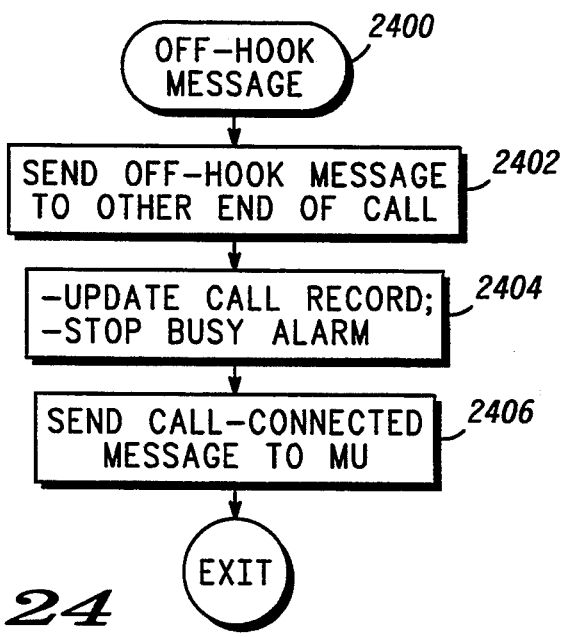
FIG. 24
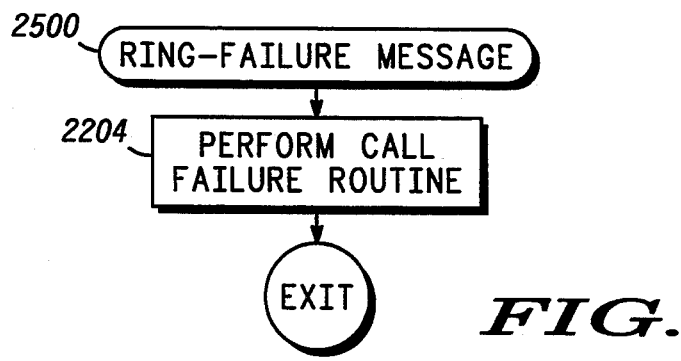
FIG. 25
FIG. 26
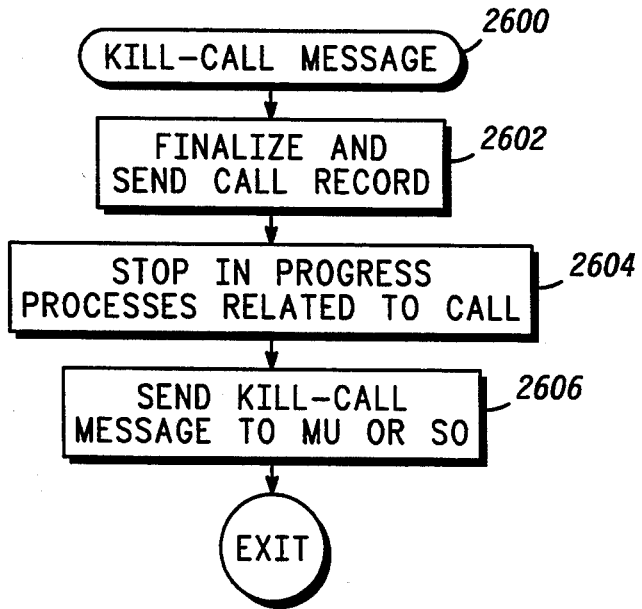

5,343,512

CALL SETUP METHOD FOR USE WITH A NETWORK HAVING MOBILE END USERS

TECHNICAL FIELD OF THE INVENTION

The present invention relates generally to communication networks. More specifically, the present invention relates to networks in which network nodes are mobile and to setting up calls in such networks.

BACKGROUND OF THE INVENTION

A network is used to supply a communication path between two end users. The network typically has the capacity to connect only a finite amount of communication traffic at any given instant. Each call consumes some portion of the total available communication resources. Moreover, a network may have numerous diverse resources available for use in forming any single call's communication path. Thus, networks often perform a call setup process prior to establishing a call's communication path. The call setup process identifies and assigns network resources to the upcoming call.

A network may be viewed as having a number of nodes. The end parties to a call communicate directly with their respective nodes. In some cases, the calling and called parties utilize the same network node. However, in other cases communication paths are established between diverse nodes, perhaps through intermediary nodes.

Call setup processes are well known in connection with networks having stationary end users. In this situation, a calling party need only identify a called party to one node of the network. That one node can analyze the called party's identity to determine how to begin identifying and assigning network resources to setup the call.

However, the call setup process becomes more difficult when one or more of the end users are mobile. When mobile end users are involved, RF links are typically used to communicate with the end users. These RF links represent scarce resources which must be conserved to the maximum extent possible. Since the end users are mobile, the locations of called parties cannot be determined simply by examining the called parties' identities. Hence, additional network resources must be consumed and additional intelligence must be designed into the network to determine how to setup a call to a called party whose location varies.

The call setup process is further complicated when at least some of the nodes of the network are mobile themselves. This situation occurs when satellites in moving-earth orbits are used as the network nodes with which network subscribers directly communicate. In this situation, the selection of particular network nodes through which a call is to be placed depends upon which satellites are in convenient locations at the instant a call is being setup.

Moreover, simple satellite designs are highly desirable to reduce network costs. In addition, simple satellite designs provide the most cost-effective network reliability because the repair of orbiting satellites is prohibitively expensive. Due to a desire to keep satellite designs simple, the complexity of call setup intelligence is preferably located in nodes of the network which are not mobile.

SUMMARY OF THE INVENTION

Accordingly, it is an advantage of the present invention that an improved call setup method is provided.

Another advantage is that the present invention provides a call setup method that is suitable for use in connection with moving end users.

Another advantage of the present invention is that a call setup method is provided which is suitable for use in connection with a moving node network.

Another advantage of the present invention is that a call setup method is provided which allows a limited computational capability resident on moving nodes of the network to be dedicated to the switching function by permitting them to act essentially as repeaters as far as the call setup process is concerned.

Yet another advantage is that the present invention provides a call setup method which automatically accommodates moving end-users while conserving network resources and quickly completing call setups.

The above and other advantages of the present invention are carried out in one form by a method of operating a mobile communication unit to facilitate the setting up of calls between the mobile unit and other units accessible through a communications network. The method calls for determining a location of the mobile unit. Next, the method reports the location of the mobile unit to the network over a communication channel. After reporting the location, the mobile communication unit receives a log-on message from the network over the communication channel. The log-on message informs the unit that the unit may engage in calls.

The above and other advantages of the present invention are carried out in another form by a method of operating a home subscriber information manager (SIM) portion of a network. The network has a population of mobile units selectively in communication with a plurality of switching offices, and the network has a plurality of SIMs similar to the home SIM. The switching offices and the SIMs are in data communication with one another. The method calls for maintaining a database of subscriber records. Each subscriber record has a mobile unit ID and has activation status data associated therewith. The home SIM receives a log-on message. The log-on message conveys a request for logging a mobile unit on to the network. The log-on message also includes a mobile unit ID value. The home SIM selects one of the records in response to the ID value from the log-on message. Additionally, the home SIM modifies the activation status data of the selected record to indicate that the mobile unit is logged on the network.

The above and other advantages of the present invention are carried out in another form by a method of operating a servicing switching office portion of a network. The network has a constellation of mobile repeaters through which communications are routed to a population of mobile units. The network also has a plurality of switching offices similar to the servicing office, and the network has a plurality of subscriber information managers (SIMs). The switching offices and the SIMs are in data communication with one another. The method calls for receiving a request for logging a mobile unit onto the network. The request includes a mobile unit ID value. The servicing office evaluates the mobile unit ID to identify a SIM to which the mobile unit is assigned. The servicing office communicates with the identified SIM to obtain service data describing the mobile unit. In addition, the servicing office creates a data record for the mobile unit. The data record includes this service data.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a table of messages sent between various entities included in the environment illustrated in FIG. 1;

FIGS. 8–14 show flow charts of procedures performed by the mobile units to support call setup within the environment illustrated in FIG. 1;

FIGS. 15–27 show flow charts of procedures performed by switching offices to support call setup within the environment illustrated in FIG. 1.

The description presented below and the Figures are linked together through the use of reference numbers. These reference numbers are chosen to reflect the number of the FIGURE in which the referenced items may be best observed. In particular, the most significant digit of all three-digit reference numbers and the most significant two digits of all four-digit reference numbers equal the number of a FIGURE in which that referenced feature may be viewed.

DETAILED DESCRIPTION OF THE PREFERRED EMBODIMENT

Figure 1:
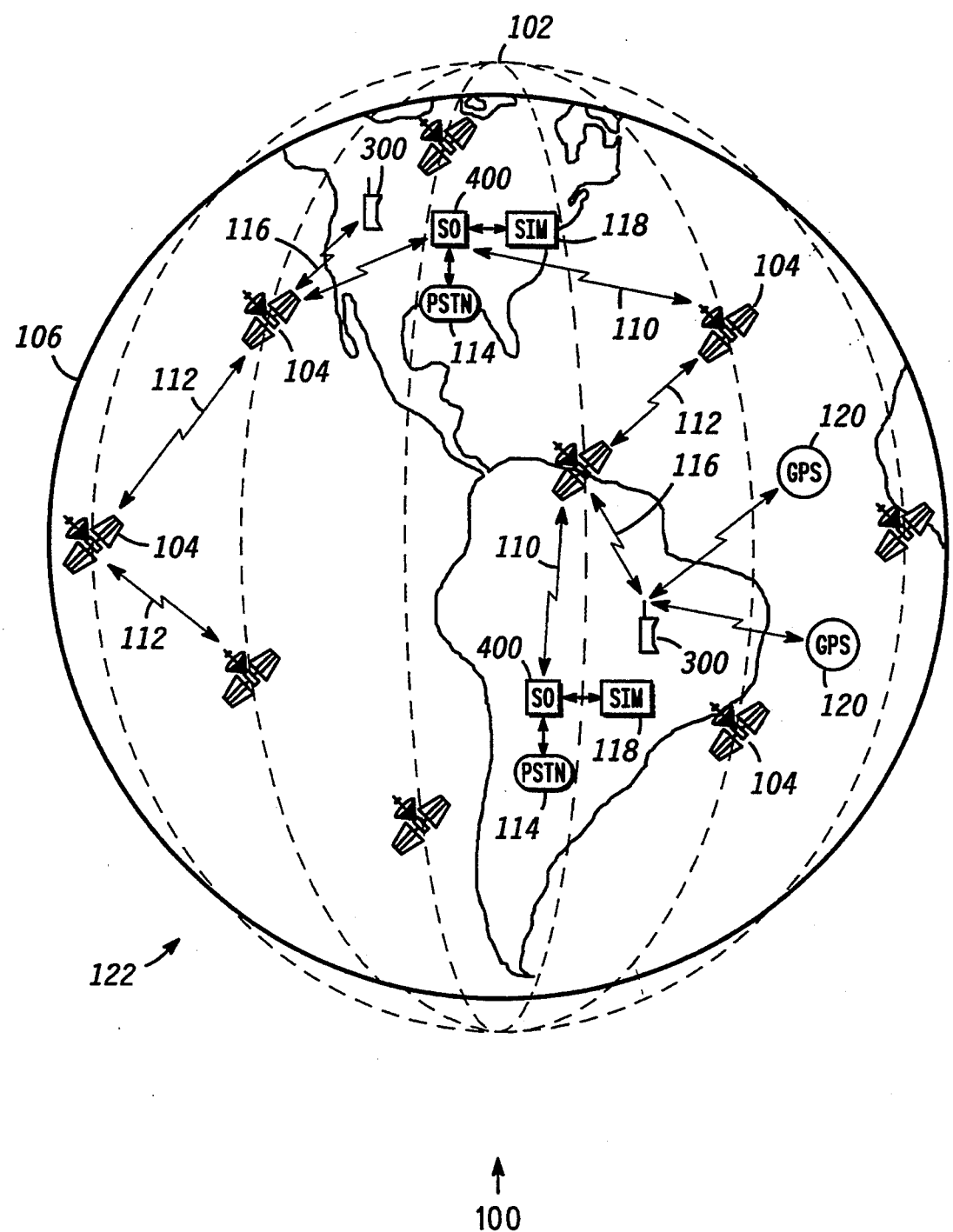
FIG. 1 shows a layout diagram of an environment within which the present invention is practiced.

FIG. 1 shows a layout diagram of an environment 100 configured in accordance with a preferred embodiment of the present invention. A constellation 102 consisting of several satellites 104 is placed in a relatively low orbit around the earth 106.

Environment 100 additionally includes one or more switching offices (SOs) 400. SOs 400 reside on the surface of earth 106 and are in data communication with nearby ones of satellites 104 through RF communication links 110. Satellites 104 are also in data communication with one another through data communication links 112. Hence, through constellation 102 of satellites 104, a SO 400 may control communications delivered to any size region of the earth 106. However, the region controlled by each SO 400 is preferably associated with one or more specific geo-political jurisdictions. SOs 400 couple to public switched telecommunication networks (PSTNs) 114, from which calls directed toward subscribers of environment 100 may be received and to which calls placed by subscribers of environment 100 may be sent.

Environment 100 also includes any number, potentially in the millions, of mobile units (MUs) 300. MUs 300 may be configured as conventional portable radio communication equipment. Environment 100 accommodates the movement of MUs 300 anywhere within the confines of earth 106, whether on or near the surface or in the atmosphere above earth 106. However, nothing requires MUs 300 to move, and environment 100 operates satisfactorily if a portion of the entire population of MUs 300 remains stationary. MUs 300 are configured to receive communications from satellites 104 and to perform other functions which are discussed below. MUs 300 communicate with nearby satellites 104 through communication channels 116.

Any number of subscriber information managers (SIMs) 118 are also included within environment 100. Each SIM 118 maintains a subscriber database that is relevant to only a discrete portion of the population of MUs 300. In the preferred embodiment, one SIM 118 is associated with each SO 400. In fact, a SIM 118 and a SO 400 may utilize the same computerized hardware. In such an embodiment, a SIM 118 and a SO 400 are separated logically rather than physically. Each SO 400 may communicate with any SIM 118 through constellation 102, PSTN 114, or internal computer structures when a SO 400 communicates with its logical partner SIM 118.

As will be discussed in more detail below, MUs 300 determine, at least in part, their own locations. In the preferred embodiment of the present invention, MUs 300 utilize a satellite positioning system 120, such as the Global Positioning System (GPS), in making this determination. System 120 includes a constellation of artificial satellites which orbit the earth. System 120 satellites may be the same or different than satellites 104. In a typical embodiment, the satellites of system 120 are different than satellites 104, but this is not essential. MUs 300 use conventional techniques to monitor and process signals transmitted by system 120 to determine their own locations. For convenience of explanation, the operation of system 120 is described below for a GPS position locating system. However, the use of a GPS position locating system is not intended to limit the present invention, and those skilled in the art will understand that other position locating systems may be used.

In general terms, environment 100 may be viewed as including a network 122 through which MUs 300 communicate. Network 122 is formed from constellation 102 of satellites 104, SOs 400, and SIMs 118. Calls may be setup between an originating MU (OMU) and a destination MU (DMU), calls may be setup between an OMU and a destination PSTN phone number, and calls may be setup between a PSTN phone number and a DMU. Generally speaking, each MU 300 engages in control communications with a nearby SO 400 through constellation 102. These control communications take place prior to forming a communication path between a MU 300 and another unit, which may be another MU 300 or a PSTN phone number. In particular, a MU 300 communicates with the SO 400 via one or more satellites 104. This SO 400 may be considered the serving SO for that particular MU 300. When the MU 300 is acting as an OMU, then the corresponding SO 400 may be viewed as an origination SO (OSO). When the MU 300 is acting as a DMU, then the corresponding SO 400 may be viewed as a destination SO (DSO).

Due to the low earth orbits, satellites 104 constantly move relative to the earth 106. If, for example, satellites 104 are placed in orbits which are around 765 km above earth 106, then an overhead satellite 104 travels at a speed of around 25,000 km/hr with respect to a point on the surface of earth 106. This allows a satellite 104 to be within view of a point on the surface of the earth 106 for a maximum period of around nine minutes. Due to the relatively low orbits of satellites 104, line-of-sight electromagnetic transmissions from any one satellite cover a relatively small area of the earth 106 at any point in time. For example, when satellites 104 occupy orbits at around 765 km above the earth, such transmissions cover areas around 4075 km in diameter.

Figure 2:
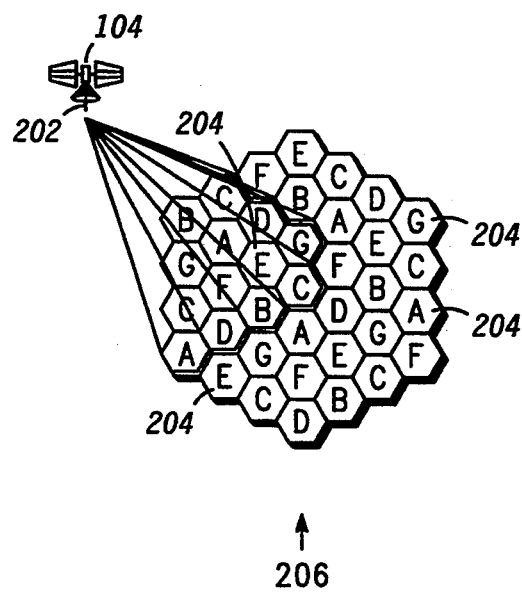
FIG. 2 shows a layout diagram of a cellular antenna pattern achieved by satellites configured in accordance with the teaching of the present invention.

FIG. 2 shows a layout diagram of a cellular antenna pattern achieved by satellites 104. As shown in FIG. 2, each satellite 104 includes an array 202 of directional antennas. Each array 202 projects numerous discrete antenna patterns on the earth's surface at numerous diverse angles away from its satellite 104. FIG. 2 shows a diagram of a resulting pattern of cells 204 that satellites 104 collectively form on the surface of earth 106. A region 206, which is bounded by a double line in FIG. 2, results from the antenna patterns produced by an antenna array 202 of a single satellite 104. Cells 204 which reside outside of region 206 are produced by antenna arrays 202 from other satellites 104.

With satellites 104 traveling at speeds of up to 25,000 km/hr with respect to the earth 106, cells 204 also travel over the earth at close to this speed. At this speed, any given point on the surface of the earth resides within a single cell 204 for no more than around one minute.

Satellites 104 communicate with MUs 300 over links 116 using numerous frequency channels. Thus, satellites 104 and MUs 300 may desirably employ a frequency division multiple access (FDMA) scheme so that numerous independent communication links may be established simultaneously. The entire spectrum of these numerous frequency channels is available within each cell. For example, a seven-cell frequency reuse pattern, depicted in FIG. 2, is implemented using time division multiple access (TDMA) techniques to prevent interference between adjacent cells. In other words, while the entire spectrum is available in each cell, adjacent cells are assigned different time slots within which that spectrum may be used. In the preferred embodiment, frames are defined to include at least seven different time slots to correspond to the seven-cell reuse pattern. Cells 204 labeled with the letter "A" in FIG. 2 are assigned one time slot, cells 204 labeled with the letter "B" are assigned another time slot, and so on. That way, cells 204 which utilize the same spectrum at the same time are geographically spaced apart from one another. While FIG. 2 illustrates a seven-cell, seven time slot arrangement, those skilled in the art will understand that a larger or smaller reuse pattern can also be used. Those skilled in the art will appreciate that such a TDMA communication scheme is established at satellites 104. Moreover, when satellites 104 move at speeds of up to 25,000 km/hr, Doppler shift and time slot synchronization parameters between a MU 300 and a satellite 104 constantly change.

In the preferred embodiment of the present invention, satellites 104 are configured as moving repeaters. In other words, satellites 104 do little more than receive data communication messages from one source and pass these messages on to a destination. Nothing requires all of communication links 110, 112, and 116 to be similar in frequency and/or timing protocol parameters. Thus, satellites 104 may also re-package messages received from one communication link into a format compatible with another link before passing the messages on. In addition, satellites 104 may include components which help resolve Doppler and timing shift parameters in connection with the operation of links 110, 112, and 116. Satellites 104 may advantageously communicate such parameters to the entities with which they communicate, such as MUs 300, SOs 400, and other satellites 104, to help in maintaining synchronization with links 110, 112, and 116.

Satellites 104 preferably serve the role of a repeater in a call setup process. The intelligence required to identify and assign network resources is preferably shared to a large extent between MUs 300, SOs 400, and SIMs 118. This allows the design of satellites 104 to remain relatively simple. As a consequence, the weight, power, and design requirements of satellites 104 are lessened and the costs associated with satellites 104 are reduced. Moreover, possible failures related to call setup are more likely to be located on the ground where they may be corrected at less expense. Those skilled in the art are well aware of devices which act as repeaters. Since satellites 104 act as repeaters, their structure and operation need not be discussed in detail herein.

Figure 3:
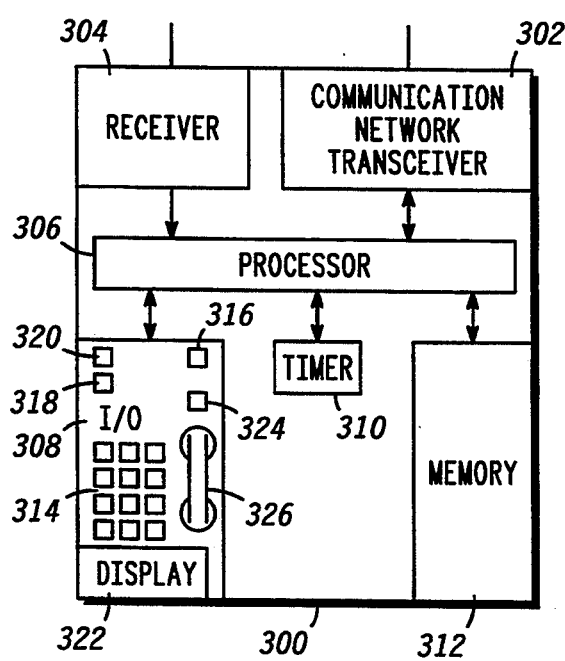
FIG. 3 shows a block diagram of a mobile unit.

FIG. 3 shows a block diagram of a mobile unit 300. Mobile unit 300 includes a communication network transceiver 302 which transmits and receives signals in a format compatible with satellites 104 and network 122 (see FIG. 1). These signals include data messages which allow MU 300 to be in data communication with a nearby satellite 104. Through this satellite 104, MU 300 is also in data communication with any other node of network 122, such as a nearby SO 400. A position location receiver 304 of MU 300, as for example a GPS receiver, receives the signals broadcast by positioning system 120 and generates data describing the current location of MU 300. Transceiver 302 and receiver 304 both couple to a processor 306. Processor 306 additionally couples to an input/output (I/O) section 308, a timer 310, and a memory 312. Processor 306 uses timer 310 to maintain the current date and time. Memory 312 includes data which serve as instructions to processor 306 and which, when executed by processor 306, cause MU 300 to carry out call setup procedures which are discussed below. In addition, memory 312 includes variables, tables, and databases that are manipulated due to the operation of MU 300.

I/O section 308 of MU 300 is used to collect inputs from a user of MU 300 and to provide outputs for the user to perceive. Section 308 includes, for example, a keypad 314 which is used to collect numbers that identify a party to whom a call may be directed. A power switch 316 is used to control the energization and de-energization of MU 300. A send key 318 is used to indicate when a called party's number has been entered, and a hook switch 320 is used in a conventional sense. A display 322 is used to present visual information to the user, and an alarm or beeper 324 is used to provide an audible alert to the user. A handset, or multitone, 326 transforms audible signals into electrical signals, and vice-versa.

Figure 4:
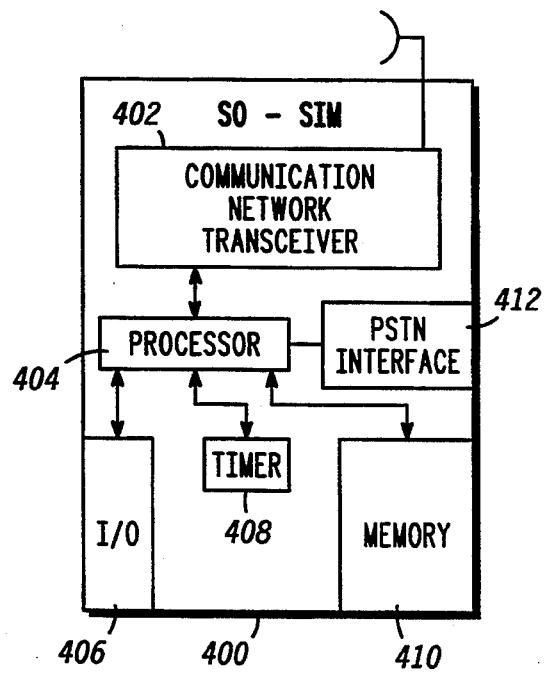
FIG. 4 shows a block diagram of a switching office and of a subscriber information manager.

FIG. 4 shows a block diagram of a SO 400. SO 400 includes a transceiver 402 which transmits and receives signals in a format compatible with satellites 104. These signals carry data messages which allow SO 400 to communicate with a nearby satellite 104, with MUs 300 that the SO 400 is currently serving, with other SOs 400 that the SO 400 may be cooperating with in setting up a call, and with any SIM 118 within network 122. Transceiver 402 couples to a processor 404. Processor 404 also couples to an I/O section 406, a timer 408, a memory 410, and a PSTN interface 412. I/O section 406 receives input from keyboards and other input devices and provides data to display terminals, printers, and other output devices. Processor 404 uses timer 408 to maintain the current date and time. Memory 410 includes semiconductor, magnetic, and other storage devices for storing data that serve as instructions to processor 404 and which, when executed by processor 404, cause SO 400 to carry out procedures which are discussed below. In addition, memory 410 includes variables, tables, and databases that are manipulated due to the operation of SO 400. Through interface 412, SO 400 communicates with the PSTN 114.

In the preferred embodiment, the block diagram of FIG. 4 also applies to SIMs 118. Processor 404, I/O section 406, timer 408, and memory 410 may serve the dual role of SO 400 and SIM 118. Those skilled in the art will appreciate that the difference between SIM 118 and SO 400 will be established through programming instructions stored in memory 410. Accordingly, the diverse logical entities of SO 400 and SIM 118 may operate in the same physical hardware.

Figures 6, 7:
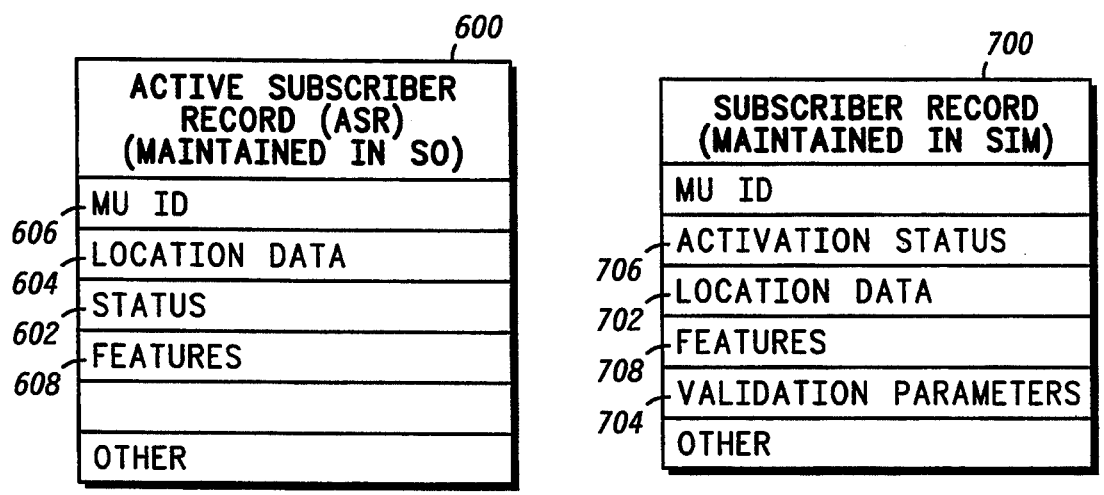
FIG. 6 shows a data structure maintained within switching offices to support the messages described by FIG. 5.
FIG. 7 shows a data structure maintained within subscriber information managers to support the messages described by FIG. 5.

FIGS. 5-7 present information which describes messages sent between MUs 300, SOs 400, and SIMs 118 in support of the call setup process and which describe data structures that are maintained, at least in part, to support call setup. In FIG. 5, columns are shown for message names, data conveyed by particular messages, and entities such as MUs 300, SOs 400, and SIMs 118 that play a role in connection with the messages.

While the table of FIG. 5 shows certain data items as being communicated by various messages, those skilled in the art will understand that other system concerns may make the communication of additional information in the messages desirable. Hence, the data items are to be viewed as a minimum set of data elements to be included in the messages.

The table of FIG. 5 includes separate columns for MU, OMU, and DMU to distinguish the various roles a MU 300 may play in connection with setting up a call. The MU column is relevant to messages which are not related to a particular call, the OMU column is relevant when a MU 300 is originating a particular call, and the DMU column is relevant when a MU 300 is the destination of a particular call. Likewise, SO, OSO, and DSO columns are provided to distinguish the various roles that a SO 400 may play in connection with a call. The SO column is relevant to messages that are not related to a particular call, the OSO column is relevant when a SO 400 is playing a role near an originating end of a call being setup, and the DSO column is relevant when a SO 400 is playing a role near a destination end of a call being setup.

FIGS. 8-14 show flow charts of procedures performed by MUs 300 to support call setup, FIGS. 15-27 show flow charts of procedures performed by SOs 400 to support call setup, and FIGS. 28-32 show flow charts of procedures performed by SIMs 118 to support call setup. Detailed discussions of the messages and data elements shown in FIGS. 5-7 are presented below where appropriate in connection with the procedures shown in FIGS. 8-32. Those skilled in the art will appreciate that the procedures discussed below in connection with FIGS. 8-32 are controlled by programming instructions placed in memories 312 and 410 of MUs 300, SOs 400, and SIMs 118.

Figure 8:
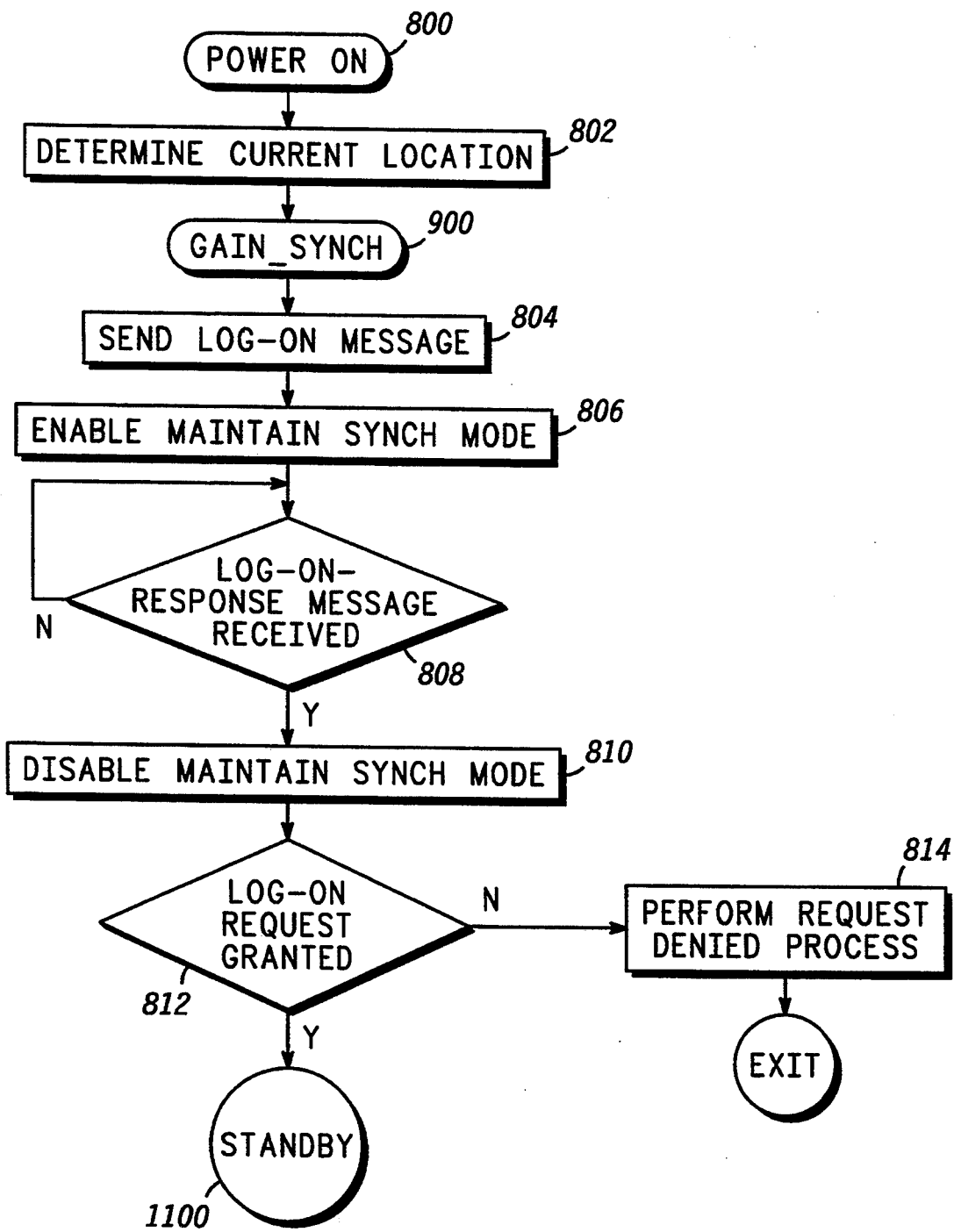

With respect to the procedures performed by MU 300 in support of call setup, as shown in FIGS. 8-14, FIG. 8 shows a Power On procedure 800 performed by any MU 300 upon energization. As shown in FIG. 8, a task 802 is among the first tasks performed by MU 300 within procedure 800. In task 802, MU 300 determines its current location. MU 300 may utilize positioning system 120 to determine its location, or any other positioning technique. Preferably, the determination of location is performed automatically, without receiving any information from a user of MU 300. After task 802 has determined the location of MU 300, a process 900 is performed to gain synchronization with link 116 to a nearby satellite 104.

FIG. 9 shows a flow chart of Gain Synch procedure 900. Generally speaking, procedure 900 allows a MU 300 to communicate with network 122. In the preferred embodiment, network 122, through satellites 104, provides numerous channels which may be used for communication within link 116. One of these channels is a broadcast control channel (BCCH). The BCCH is continuously transmitted for receipt by MUs 300. By tracking the BCCH in a task 902, a MU 300 may perform an initial form of synchronization and obtain data that describes the satellite's identity and cell number. When MU 300 can receive the BCCH's data, a task 904 sends a "hello" message to this satellite on a random access channel (RACH). The hello message attempts to inform the satellite 104 of the MU's identity. The random access channel(s) are preferably operated in accordance with a multiple access technique known to those skilled in the art, such as a conventional carrier sense multiple access technique (CSMA) or the like. Thus, task 904 sends the hello message only if the RACH appears to be silent at the time of transmission.

After task 904, MU 300 monitors the BCCH in a query task 906 to detect any messages that might be directed to the MU 300. If, after a predetermined period of time, a message is not detected on the BCCH, a task 908 alters transceiver parameters and routes program control back to task 902 to again attempt to communicate with the satellite 104. Those skilled in the art will appreciate that task 908 may adjust frequency parameters to compensate for Doppler and may adjust timing parameters to compensate for a lack of time slot synchronization. By remaining in the loop of tasks 902-908 and adjusting frequency and timing parameters at task 908 in a systematic manner, the satellite 104 will eventually be able to detect the hello message and will respond with a message addressed to the MU 300 on the BCCH.

When this message is received, it will identify the MU 300 and convey the fact that the MU 300 has gained synchronization. This message will also inform the MU 300 of the parameters needed to more precisely adjust frequency and timing parameters of transceiver 302 for efficient communication. In the preferred embodiment, it instructs the MU 300 to begin communication operations on a specified control channel (CCH) of link 116. Accordingly, after receipt of this message, a task 910 is performed to adjust transceiver 302 to operate on the specified channel. Synchronization has been achieved, and duplex communication may now take place over this CCH.

With reference back to FIG. 8, after procedure 900 has been performed to gain synchronization, a task 804 causes a Log-On message 502 (see FIG. 5) to be sent to a nearby SO 400. Log-On message 502 includes a value (MU ID) which uniquely identifies the MU 300 sending message 502 and the location of the MU 300. Log-On message 502 may additionally include an encrypted authentication code which can be used in deciding whether to allow MU 300 to gain access to network 122.

Those skilled in the art will appreciate that the sending of any message, whether message 502 or otherwise, by any entity within environment 100, whether MU 300 or otherwise, may include waiting for the receipt of an appropriate acknowledgment message. If an acknowledgement is not received within a predetermined period of time, then the message may be repeated. Likewise, the receipt of any message may include the transmission of an appropriate acknowledgement message in response to the received message. Such details are appreciated by those skilled in the art and are not discussed further herein.

After sending Log-On message 502, MU 300 performs a task 806 to enable a maintain synchronization (synch) mode of operation and waits at a query task 808 until a Log-On-Response message 504 is received over the CCH.

Generally speaking, the maintain synch mode of operation causes the frequency and timing parameters programmed into transceiver 302 to track Doppler and timing characteristics of the moving nodes, or satellites 104, of network 122. This mode will be discussed in more detail below in connection with FIG. 10. When task 808 determines that Log-On-Response message 504 has been received, a task 810 disables the maintain synch mode of operation, and a query task 812 evaluates Log-On-Response message 504 to determine whether access to network 122 has been granted. By disabling the maintain synch mode of operation, synchronization with the CCH will soon be lost by MU 300 due to the movement of satellites 104. By losing synchronization, resources of network 122 are conserved so that they may be used by other MUs. MU 300 may continue to track the BCCH.

When task 812 determines that the MU's log-on request has been granted, program control progresses to a Standby procedure 1100, which is described below. When the log-on request is denied, a process 814 is performed in response to the denial. Process 814 may, for example, display an appropriate message on display 322.

Figure 10:
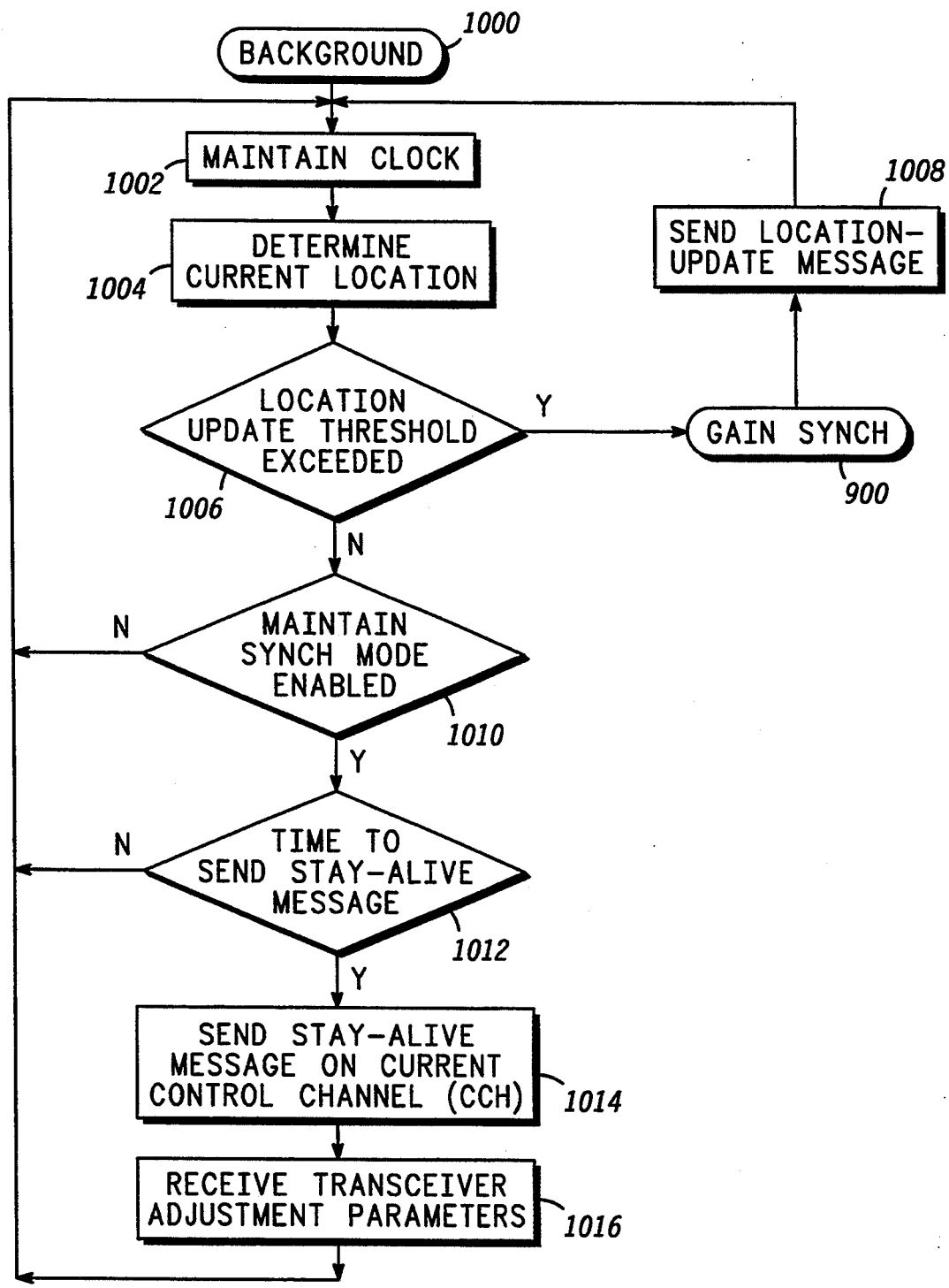

FIG. 10 shows a flow chart of Background procedure 1000. Procedure 1000 is performed in a background mode by MU 300. In other words, procedure 1000 continuously operates even though other tasks not related to procedure 1000 are being performed in generally the same time frame. A task 1002 utilizes timer 310 to maintain a time-of-day clock. A task 1004 determines the current location of MU 300 in the same manner as task 802, discussed above.

A query task 1006 determines whether a Location-Update message 506 needs to be sent to network 122. Message 506 reports the current location of MU 300 to network 122. As will be discussed below, this location data is retained at a serving SO 400 and in a home SIM 118 for the MU 300. In one embodiment, message 506 is sent on a regular schedule, such as every few hours. In another embodiment, message 506 is sent when MU 300 travels a predetermined distance from a location which was previously reported to network 122. In yet another embodiment, network 122 sends data describing a border to MU 300, and MU 300 sends Location-Update message 506 only when MU 300 passes over the border characterized by the border data.

In addition, message 506 is sent when MU 300 loses its ability to track the BCCH for a predetermined period of time. DMU 300 may lose its ability to track the BCCH when it is carried into a basement or some other structure which interferes with reception. Task 1006 evaluates an account (discussed below) which is kept of BCCH unavailability. In each embodiment, task 1006 evaluates some sort of threshold to determine if MU 300 has exceeded the threshold. When one of such thresholds is exceeded, the MU's location is reported to network 122.

Regardless of the particular embodiments used to determine when to report location, when task 1006 determines that message 506 needs to be sent to network 122, Gain Synch procedure 900, discussed above, is performed to allow MU 300 to communicate with network 122, and a task 1008 sends Location-Update message 506 over the CCH obtained through procedure 900. Message 506 conveys the ID of MU 300 and data describing the current location of MU 300. After task 1008, program control proceeds back to task 1002, or optionally (not shown) to a task 1010.

When task 1006 determines that message 506 need not be sent yet, query task 1010 determines whether the maintain synch mode of operation, discussed above, is enabled. If this mode of operation is not enabled, then program control returns to task 1002 to complete a program loop.

When the maintain synch mode of operation is enabled, a query task 1012 determines whether a timer has expired to indicate that a stay-alive message should be sent to satellite 104 so that synchronization may be maintained. When satellites 104 are placed in the above-discussed low earth orbits which cause them to move at a rate of around 25,000 km/hr, frequency and timing adjustments to transceiver 302 are desirably made around every 500 msec. When task 1012 determines that a stay-alive message should be sent, a task 1014 sends the stay-alive message over the currently active CCH. The stay-alive message identifies the MU 300. By sending the stay-alive message to a satellite 104, the satellite 104 will utilize conventional techniques to calculate Doppler and timing shift and automatically respond with a gained-synch message. In a task 1016, MU 300 receives the gained-synch message, which provides parameters to use in making timing and frequency adjustments to transceiver 302. After adjusting transceiver 302 to maintain synchronization with the CCH, program control loops back to task 1002.

Figure 11:
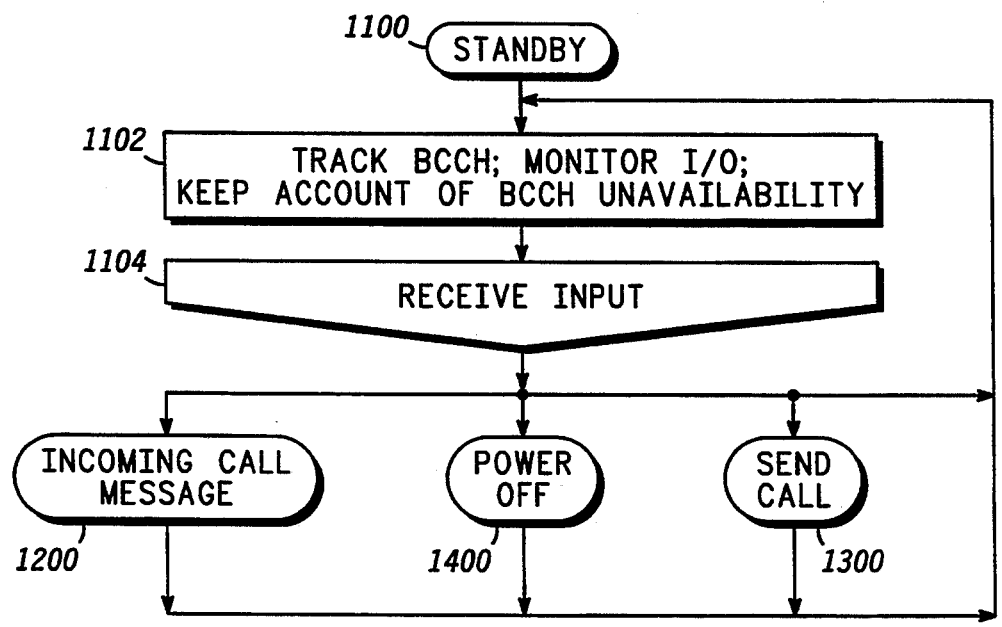

FIG. 11 shows a flow chart of a Standby procedure 1100. As discussed above, procedure 1100 is performed after MU 300 has been logged on network 122. Generally speaking, in procedure 1100 MU 300 simply waits for a call to be setup. In particular, at a task 1102, MU 300 monitors the BCCH. The BCCH is used by network 122 to inform MU 300 of an incoming call. Task 1102 also keeps an account of the time during which the BCCH cannot be received. When the BCCH may again be received, this account may desirably be reset. This account is used as discussed above in connection with task 1006. In addition, task 1102 monitors I/O section 308 to determine if the user of MU 300 is entering information which will lead to the sending of a call. In a preferred embodiment, a user may manipulate keypad 314 to enter a phone number or other identifying code, then press send button 318 to cause the phone number or code to be sent to network 122.

A switching task 1104 responds to a received input that signals a call setup related activity. Task 1104 routes program control to an appropriate procedure when a call setup related activity occurs. If no call setup activity occurs, task 1102 repeats. If an Incoming-Call message 508 is detected on the BCCH, then a procedure 1200 is performed. If a manipulation of I/O section 308 which instructs MU 300 to place a call is detected, a Send Call procedure 1300 is performed. And, if a manipulation of power switch 316 is detected, a Power Off procedure 1400 is performed. Those skilled in the art will appreciate that task 1104 may additionally recognize other stimulations not related to call setup and route program control accordingly.

Figure 12:
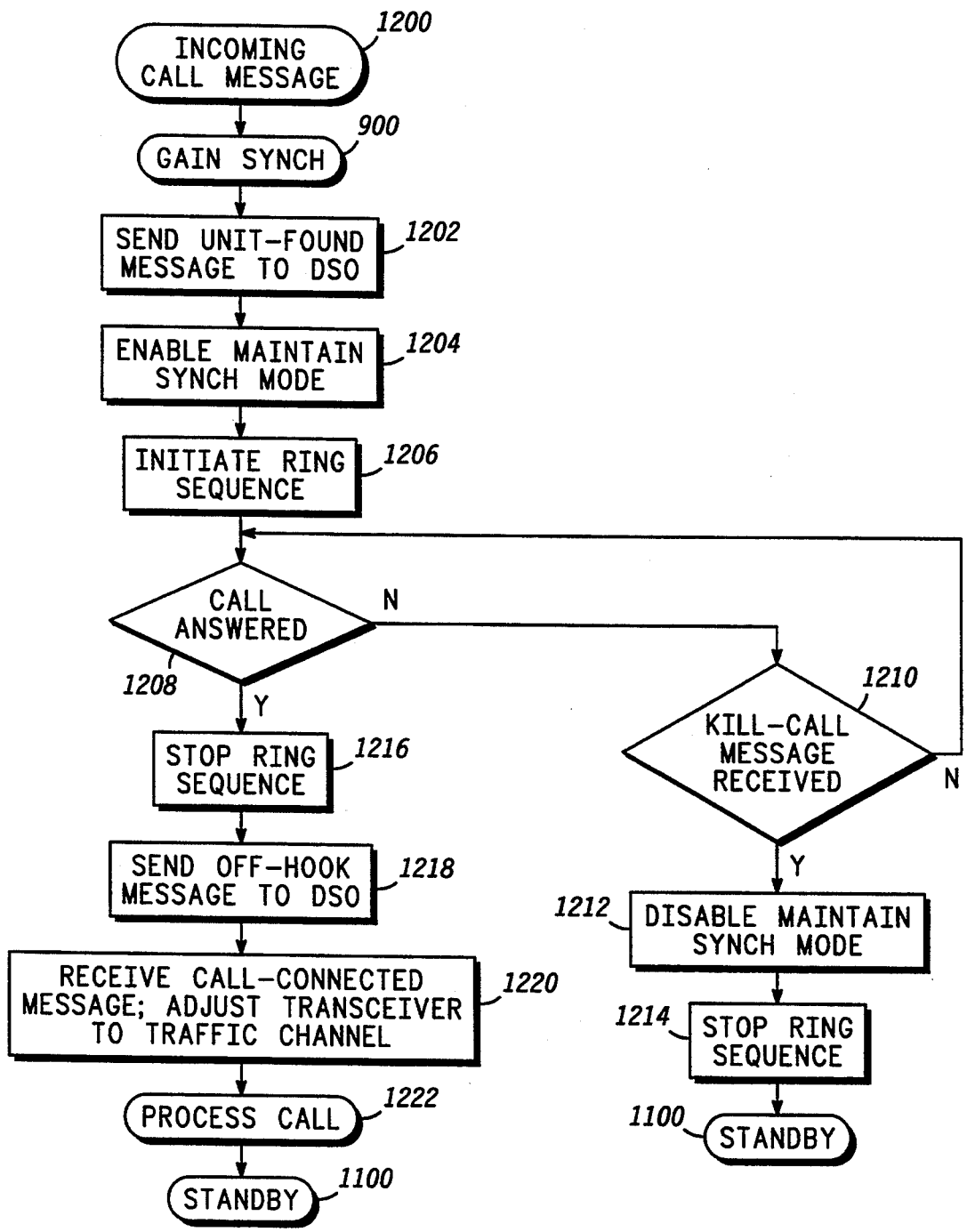

FIG. 12 shows a flow chart of Incoming-Call message procedure 1200. Procedure 1200 is performed whenever MU 300 receives Incoming-Call message 508. This message is received over the BCCH, and includes the MU's ID. Message 508 informs MU 300 that a call is being setup for MU 300. In other words, MU 300 is the called party in a call. When MU 300 receives the message 508, it acts as a destination MU or DMU 300 for the purposes of FIG. 12.

When message 508 is received, procedure 1200 performs Gain Synch procedure 900, discussed above. As a result of performing procedure 900, DMU 300 can communicate with network 122 over a CCH. After gaining synchronization with the CCH, a task 1202 sends a Unit-Found message 510 to its serving SO 400. The SO 400 serving DMU 300 controls the destination end of the call being setup. Hence, this SO 400 will be referred to as DSO 400 for the purposes of FIG. 12. Unit-Found message 510 conveys the identity of DMU 300 and informs DSO 400 that the DMU 300 to which a call is being placed has now been found. As will be discussed below, this causes network 122 to cease searching for DMU 300.

A task 1204 enables the maintain synch mode of operation discussed above. This will cause DMU 300 to hold the CCH open for future communications. A task 1206 initiates a ring sequence. DMU 300 may, for example, initiate the ring sequence by operating beeper 324 so that a ringing signal is produced to alert a user of DMU 300 to the incoming call.

After task 1206, a query task 1208 monitors hook switch 320 to determine when an off-hook condition occurs. Those skilled in the art will appreciate that an off-hook condition refers to a user answering the call whether or not an actual hook switch is utilized in making the determination. If the off-hook condition is not detected, then the user has not yet acknowledged the incoming call, and a query task 1210 determines whether a Kill-Call message 512 has been received from network 122 at DMU 300. Kill-Call message 512 informs DMU 300 that the call is being terminated. If no Kill-Call message 512 has been received at DMU 300, program control loops back to task 1208 to wait until either the call is killed or the user answers DMU 300.

If Kill-Call message 512 has been received at DMU 300 when task 1210 is performed, a task 1212 disables the maintain synch mode of operation so that DMU 300 will lose synchronization with the CCH and the CCH will be released for use by other MUs. A task 1214 stops the ringing sequence because the user need not now be alerted to an incoming call. After task 1214, program control returns to Standby procedure 1100 to await the next call setup related event.

When the user of DMU 300 answers the incoming call, task 1208 routes program control to a task 1216. Task 1216 stops the ringing sequence because the user need no longer be alerted to the incoming call. A task 1218 sends an Off-Hook message 514 to DSO 400 over the CCH. Message 514 carries the MU ID of DMU 300 and informs DSO 400 that the user has answered the call. In response, DSO 400 allocates the resources needed to connect the call to DMU 300.

After task 1218, a task 1220 waits until a Call-Connected message 516 is received. Message 516 is directed to DMU 300 and informs DMU 300 that the call is now connected. Message 516 carries information which informs DMU 300 to tune in a traffic channel (TCH) to use in the upcoming call. In the preferred embodiment, the TCH is a duplex channel that is assigned by satellite 104 in accordance with the current channel availability of satellite 104. In task 1220, DMU 300 adjusts transceiver 302 to tune in the specified TCH. Once a traffic channel is assigned, real time, continuous communication, given the TDMA scheme discussed above, takes place over the TCH.

DMU 300 may now process the call, as shown at task 1222. By processing the call, audio signals are continuously obtained from handset 326, digitized, vocoded, packetized to conform to the TDMA protocol of the TCH, and transmitted over the TCH to network 122. Likewise, data packets are continuously received over the TCH, decoded, and presented in audible form at handset 326. In addition, DMU 300 continuously monitors hook switch 320 to determine if the user of DMU 300 ends the call and monitors TCH for Kill-Call message 512, which would also inform DMU 300 that the call has ended. Although not related to setting up a call, when DMU 300 ends a call, DMU 300 sends Kill-Call message 512 to network 122. When the call ends, program control returns to Standby procedure 1100 to await the next call setup related event.

Figure 13:
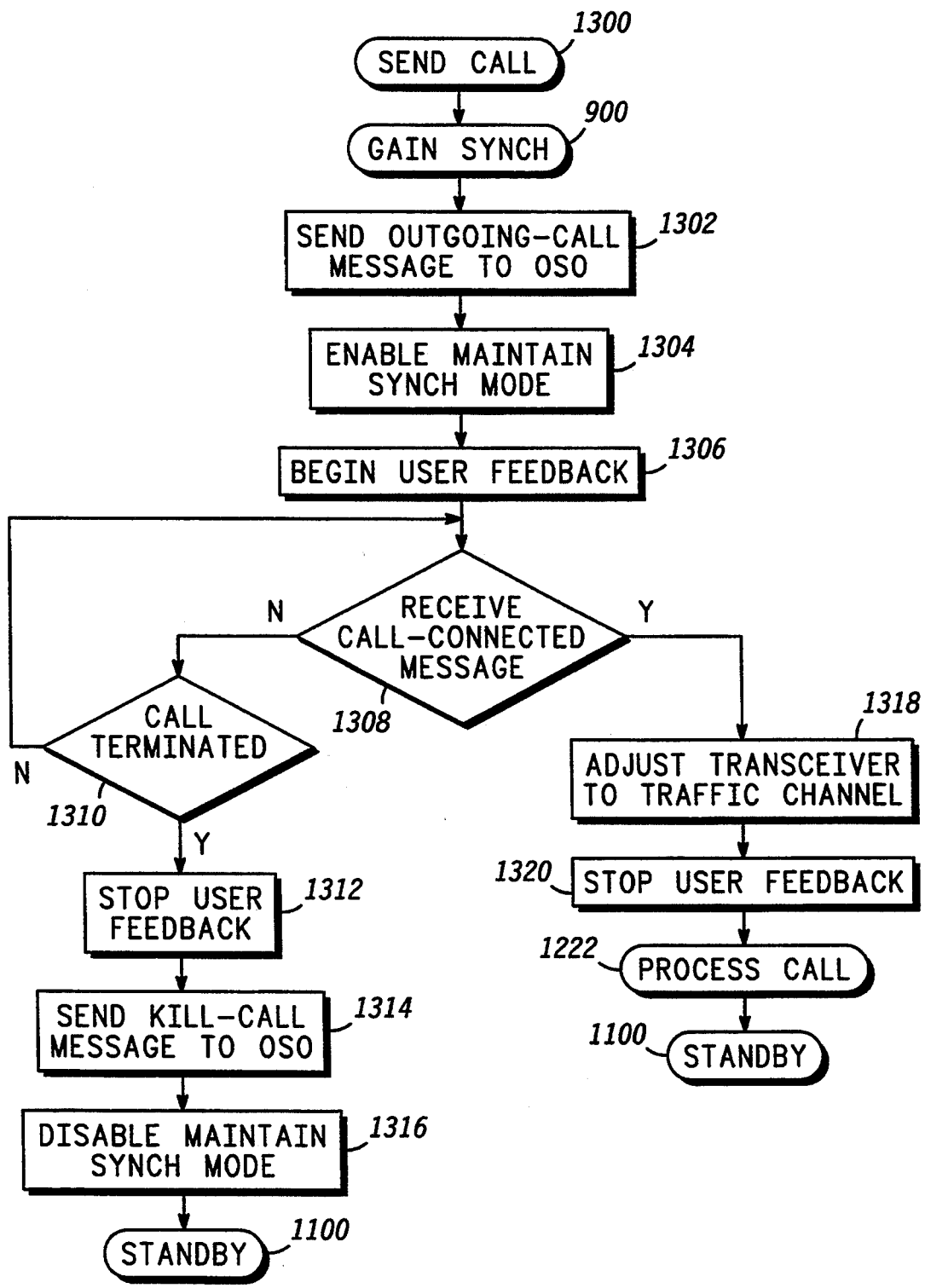

FIG. 13 shows a flow chart of Send Call procedure 1300. Procedure 1300 is performed when a user has instructed MU 300 to originate a call to another unit or party. When MU 300 receives instructions to originate a call by a user, it acts as an origination MU, or OMU 300 for the purposes of FIG. 13.

Procedure 1300 performs Gain Synch procedure 900, discussed above. As a result of performing procedure 900, OMU 300 can communicate with network 122 over a CCH. After gaining synchronization with the CCH, a task 1302 sends an Outgoing-Call message 518 to its serving SO 400 over the CCH. The SO 400 serving OMU 300 controls the origination end of the call being setup. Hence, this SO 400 will be referred to as 400 for the purposes of FIG. 13. Outgoing-Call message 518 conveys the identity of OMU 300 and informs OSO 400 that OMU 300 wishes to setup a call. Message 518 additionally conveys a code that identifies the destination party. This code may be a phone number for a device coupled to PSTN 114 or another code which identifies a DMU 300. Preferably, DMUs 300 are uniquely identified using a series of digits which conform to telephone numbering standards. As will be discussed below, this causes OSO 400 to initiate control communications related to setting up the requested call.

A task 1304 enables the maintain synch mode of operation so that the CCH will remain open for future communications. A task 1306 begins some sort of user feedback. The user feedback may be a conventional ringing tone, or may be some other automated recording which informs the user that progress is being made in setting up the requested call.

A query task 1308 determines whether Call-Connected message 516 has been received yet at OMU 300. If the Call-Connected message has not been received, a query task 1310 monitors I/O section 308, for example hook switch 320 of section 308, to determine whether the user has decided to terminate the call. If a call termination condition is not indicated, program control loops back to task 1308. Procedure 1300 continues to loop through tasks 1308-1310 until OMU 300 receives Call-Connected message 516 or until the user of OMU 300 terminates the call. Of course, those skilled in the art will appreciate that MUs 300 may be designed so that portions of I/O section 308 other than hook switch 320 can be used to signal a call termination.

If task 1310 determines that the user of OMU 300 has terminated the call, then a task 1312 stops the user feedback which was begun above in task 1306, and a task 1314 sends Kill-Call message 512 to OSO 400 over the CCH. As a result of task 1314, OSO 400 will cease operations directed toward setting up the call. A task 1316 is performed to disable the maintain synch mode of operation so that OMU 300 will soon lose synchronization with the CCH and the CCH will become available for use by other MUs 300. After task 1316, program control returns to Standby procedure 1100 to await the next call setup related event.

When task 1308 encounters Call-Connected message 516, a task 1318 adjusts transceiver 302 to the traffic channel (TCH) specified by message 516. A task 1320 stops the user feedback started above in task 1306. The call has now been connected, and may be processed as discussed above in connection with process 1222. Upon completion of the call, program control returns to Standby procedure 1100 to await the next call setup related event.

The powering off of MU 300 is also a call setup related event. FIG. 14 shows a flow chart of Power Off procedure 1400, which is performed when a command to turn MU 300 off is detected from I/O section 308. Procedure 1400 performs Gain Synch procedure 900, discussed above. As a result of performing procedure 900, MU 300 can communicate with network 122 over a CCH. After gaining synchronization with the CCH, a task 1402 sends a Log-Off message 520 to network 122. Message 520 carries the identity of the logging off MU 300 and informs network 122 that the MU 300 is powering down. As will be discussed in more detail below, network 122 uses Log-On and Log-Off messages 502 and 520, respectively, to keep track of whether a MU 300 is available to receive calls. By determining when a MU 300 is not available to receive calls because of being powered off, network 122 is generally able to block the setting up of calls to powered off MUs 300 at an early stage in the call setup process. This conserves network resources because the call setup process is prevented from progressing to near completion in such circumstances. After task 1402, a task 1404 de-energizes MU 300. When MU 300 is again powered up, it will begin performing Power On procedure 800, discussed above.

FIGS. 15-27 show flow charts of procedures performed by SO 400 in support of the call setup process. Generally speaking, SO 400 receives and responds to various messages to support the call setup process. Messages can be received from MUs 300 which are logging on or logging off network 122. Messages can be received from OMUs 300, which are attempting to originate a call, and from DMUs 300 to which calls are being directed. Messages may be received at DSOs 400 from OSOs 400, and vice-versa, to support call setup. And messages may be received from SIMs 118 in response to call setup related messages directed to SIMs 118. SOs 400 send various messages to these entities in response to the messages that are received. SOs 400, with support from SIMs 118, possess the bulk of the intelligence used in setting up calls in environment 100. As discussed above, the role of the moving nodes provided by satellites 104 is simply to serve substantially as repeaters for transferring messages between MUs 300 and serving SOs 400.

Those skilled in the art will appreciate that SOs 400 may engage in numerous other activities related to the operation of network 122. In addition, while the preferred embodiment of the present invention places the bulk of call setup intelligence in SOs 400, those skilled in the art will appreciate that some of the features described herein as taking place in SOs 400 may desirably be shifted to satellites 104 in particular applications, and that the precise location of this intelligence is of lesser importance than the functions achieved thereby.

Figure 15:
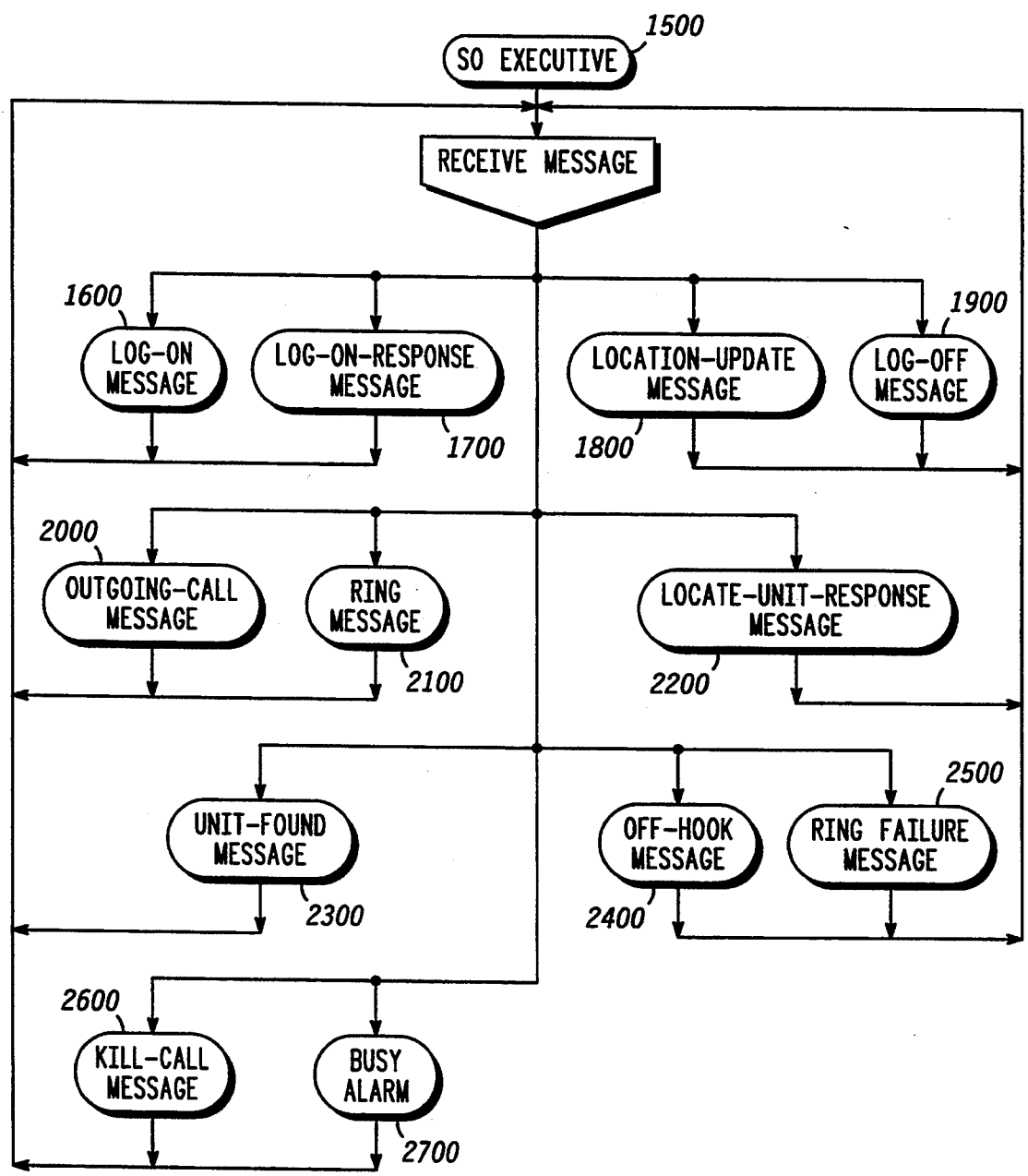

FIG. 15 shows a flow chart of a SO Executive procedure 1500 which SO 400 performs in support of the call setup process. Procedure 1500 examines messages received at SO 400 and switches program control to an appropriate procedure to respond to the received message. Those skilled in the art will appreciate that all procedures controlled by procedure 1500 may be reentrant. Hence, numerous diverse ones of these procedures may be in progress at any given time with respect to one or more calls being setup, and at any single point in time each of these procedures may be in progress multiple times with respect to different calls. FIGS. 16-27 present flow charts of these procedures.

Figure 16:
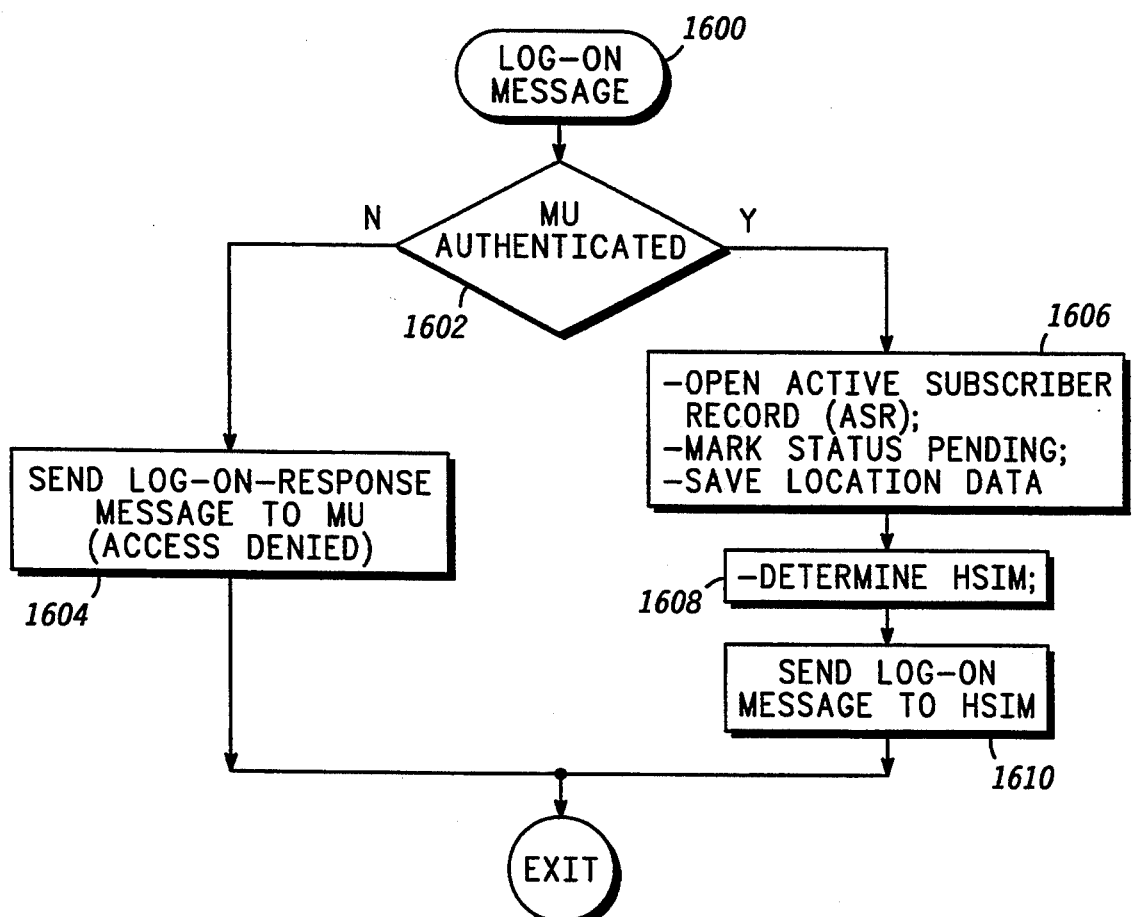

FIG. 16 shows a flow chart of a Log-On message procedure 1600. SO 400 performs procedure 1600 when a Log-On message 502, discussed above in connection with MU procedure 800, is received. The receipt of a Log-On message 502 indicates that a MU 300 is attempting to access network 122 to receive communication services.

Procedure 1600 performs a query task 1602 to authenticate the MU 300. Task 1602 may advantageously perform a decryption operation on the authentication code, then examine the authentication code by evaluating error detection codes and the like to determine authenticity. If the authentication process concludes that MU 300 is not an authorized subscriber to network 122, then a task 1604 constructs and sends Log-On-Response message 504 back to MU 300. Task 1604 causes message 504 to convey an "access denied" message to MU 300. After task 1604, program control exits procedure 1600. By authenticating MUs 300 at SOs 400, many unauthorized access attempts may be detected and blocked without consuming further resources of network 122. Such MUs 300 will not be allowed to place calls or receive calls, and such MUs 300 will be blocked without the consumption of a significant amount of network resources.

When task 1602 determines that MU 300 appears to be authentic, a task 1606 opens an active subscriber record (ASR) 600 for MU 300. FIG. 6 shows exemplary data items maintained in an ASR 600. One ASR 600 is kept in a database for each active subscriber. SO 400 generally communicates with those MUs 300 that are located within its region of jurisdiction. Accordingly, ASRs 600 for all active MUs 300 within environment 100 are distributed throughout the SOs 400 within environment 100.

Task 1606 marks a status data element 602 of the just-opened ASR 600 to indicate a pending status. This indicates that the MU 300 is not yet logged on network 122. In addition, task 1606 saves the location data carried by Log-On message 502 in a location data element 604 of ASR 600. The ID of the MU 300 sending the Log-On message 502 is saved in a data element 606. Those skilled in the art will appreciate that ASRs 600 may be arranged or otherwise linked with other information so that they may be quickly accessed given a MU ID value. Moreover, nothing prevents network 122 from substituting a local or temporary ID for the unique system-wide MU ID.

With reference back to FIG. 16, a task 1608 determines the "home" SIM (HSIM) 118 for the MU 300 sending Log-On message 502. The HSIM is the SIM 118 to which that MU 300 is assigned. It may not be the SIM 118 associated with the SO 400 serving the region in which the MU 300 is currently located. The HSIM determination may advantageously be made by evaluating the MU ID. Preferably, MU IDs are assigned so that a particular field of the MU ID (4–10 bits for example) identifies the HSIM for that MU 300. Thus, by examining this field the SO 400 receiving the Log-On message 502 may identify the MU's HSIM 118.

After task 1608, Log-On message 502 is sent on to the HSIM 118 at a task 1610. The sending of message 502, or any other message within the call setup process, on to HSIM 118, or any other entity within network 122, does not imply that the message is unaltered. Rather, an entity may add, delete, or alter data conveyed by the message without changing the basic thrust of the message. For example, task 1610 adds data to message 502 that identifies the SO 400 sending the message to HSIM 118. That way HSIM 118 may know the address of the SO 400 to which a response is directed. In one embodiment, SO 400 may simply replace the location data carried by message 502 with its own ID. Since SOs 400 are responsible for their own jurisdictions, their IDs serve as location data, albeit not as precise, for the HSIMs 118. In addition, SO 400 may remove the authentication code from message 502 if HSIM 118 does not rely on this code in performing its validation of MU 300. After task 1610, program control exits from procedure 1600 and returns to SO Executive procedure 1500.

Figure 17:
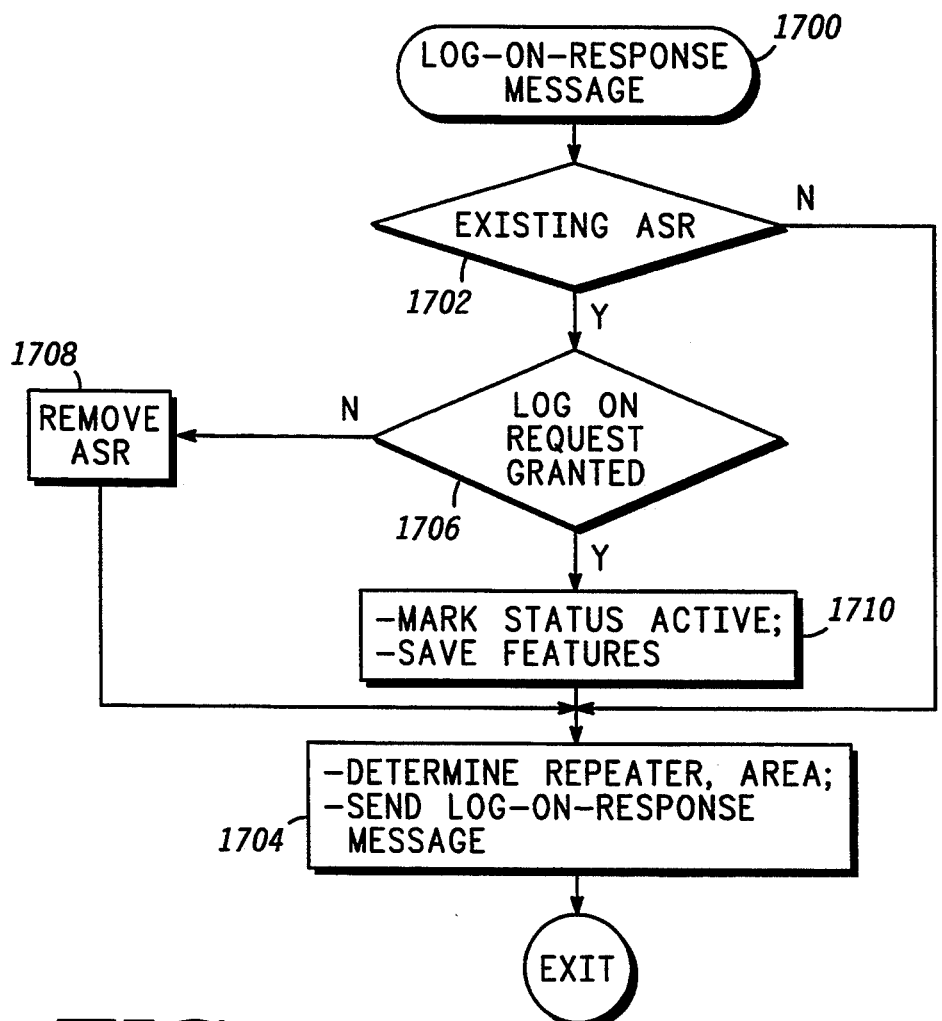

FIG. 17 shows a flow chart of a Log-On-Response message procedure 1700. SO 400 performs procedure 1700 when a Log-On-Response message 504, discussed above in connection with MU procedure 800, is received. Message 504 is received at a SO 400 from a HSIM 118. Message 504 indicates whether the MU 300 identified therein has been granted access to network 122. If MU 300 has been granted access, message 504 carries data descriptive of MU 300 which are relevant to setting up calls for MU 300.

Procedure 1700 performs a task 1702 to determine if an ASR 600 exists for the MU 300 to which message 504 is directed. Message 504 carries a MU ID which task 1702 may use in accessing the appropriate record. If no ASR 600 is present, a task 1704 determines an appropriate repeater area to use in sending the Log-On-Response message on to the MU 300. In the preferred embodiment where satellites 104 represent repeaters, task 1704 determines an appropriate routing code or satellite 104 and cell 204 to use for transmitting message 504 to MU 300. Task 1704 then sends the Log-On-Response message 504 on to the MU 300. When no ASR exists for a MU 300, the Log-On-Response message 504 is configured to tell MU 300 that access to network 122 is denied. After task 1704, program control exits procedure 1700 and returns to Executive procedure 1500.

When task 1702 determines that an ASR 600 exists for the MU 300 identified by message 504, a query task 1706 examines the message 504 received from HSIM 118 to determine whether access to network 122 has been granted. If access has not been granted, a task 1708 purges or removes the ASR 600 for this MU and program control proceeds to task 1704, discussed above, to inform MU 300 that access has been denied. Location data 604 from the removed ASR 600 may be used in determining which satellite 104 to use in sending message 504 on to MU 300.

When task 1706 determines that message 504 conveys access granted information, a task 1710 marks status data element 602 of ASR 600 as being active or logged on. This active status will be interpreted as a not busy state. Task 1710 also obtains features data from message 504 and saves this data in a features data element 608 of ASR 600. The features describe various communication service options which have been subscribed to for MU 300. Such features may include, for example, a service priority level, a ring through feature, a call forward feature, a conference call feature, or any other feature conventionally known in connection with telephony.

After task 1710, task 1704 again sends Log-On-Response message 504 on to MU 300. This time, task 1704 configures message 504 to communicate an access granted message. Moreover, task 1704 may desirably remove the features from message 504 before sending it on to MU 300 if such data are of no use to MU 300.

Figure 18:
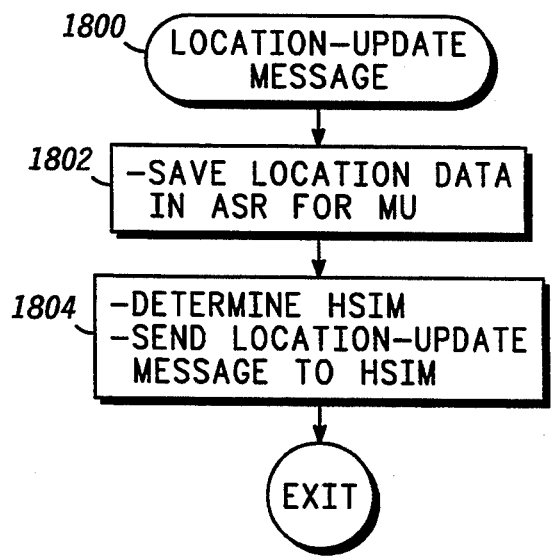

FIG. 18 shows a flow chart of a Location-Update message procedure 1800. SO 400 performs procedure 1800 when a Location-Update message 506, discussed above in connection with MU procedure 1000, is received. Message 506 is received at a SO 400 from a MU 300. Message 506 identifies a MU 300 that is currently logged on network 122 and provides current location data for the MU 300.

Procedure 1800 performs a task 1802 to obtain the location data from message 506 and save the location data in the MU's ASR 600. Next, an optional task 1804 determines the HSIM for MU 300 and sends message 506 on to that HSIM 118. As discussed above, the location data sent on to HSIM 118 need not be identical to the location data supplied to SO 400. The location data sent from SO 400 to HSIM 118 may, for example, simply identify the SO 400 within whose jurisdiction MU 300 currently resides. Although not shown, those skilled in the art will appreciate that procedure 1800 may additionally examine the location data and refrain from passing message 506 on to HSIM 118 if the location data to be passed on to HSIM 118 would be substantially identical to location data already recorded at HSIM 118. In addition, nothing prevents SO 400 from passing a message back to MU 300 so that MU 300 may use the message in establishing a threshold for use in connection with task 1006, discussed above. After task 1804, program control exits procedure 1800 and returns to Executive procedure 1500.

Figure 19:
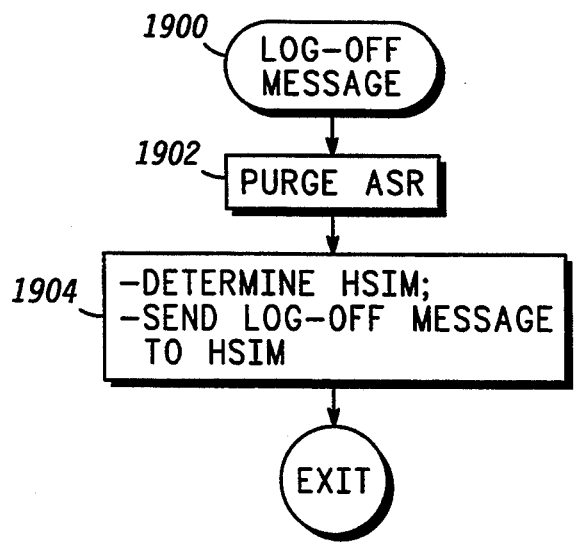

FIG. 19 shows a flow chart of a Log-Off message procedure 1900. SO 400 performs procedure 1900 when a Log-Off message 520, discussed above in connection with MU procedure 1400, is received. Message 520 is received at a SO 400 from a MU 300. Message 520 identifies a MU 300 that is currently logged on network 122. Procedure 1900 performs a task 1902 to remove or purge the MU's ASR 600 from the database of ASRs 600. As a result of purging ASR 600, calls will not be received from or directed to that MU 300 until another Log-On message 502 is received. A task 1904 is performed to determine the HSIM 118 to which MU 300 is assigned and to send Log-Off message 520 on to that HSIM 118. After task 1904, program control exits procedure 1900 and returns to Executive procedure 1500.

Figure 20:
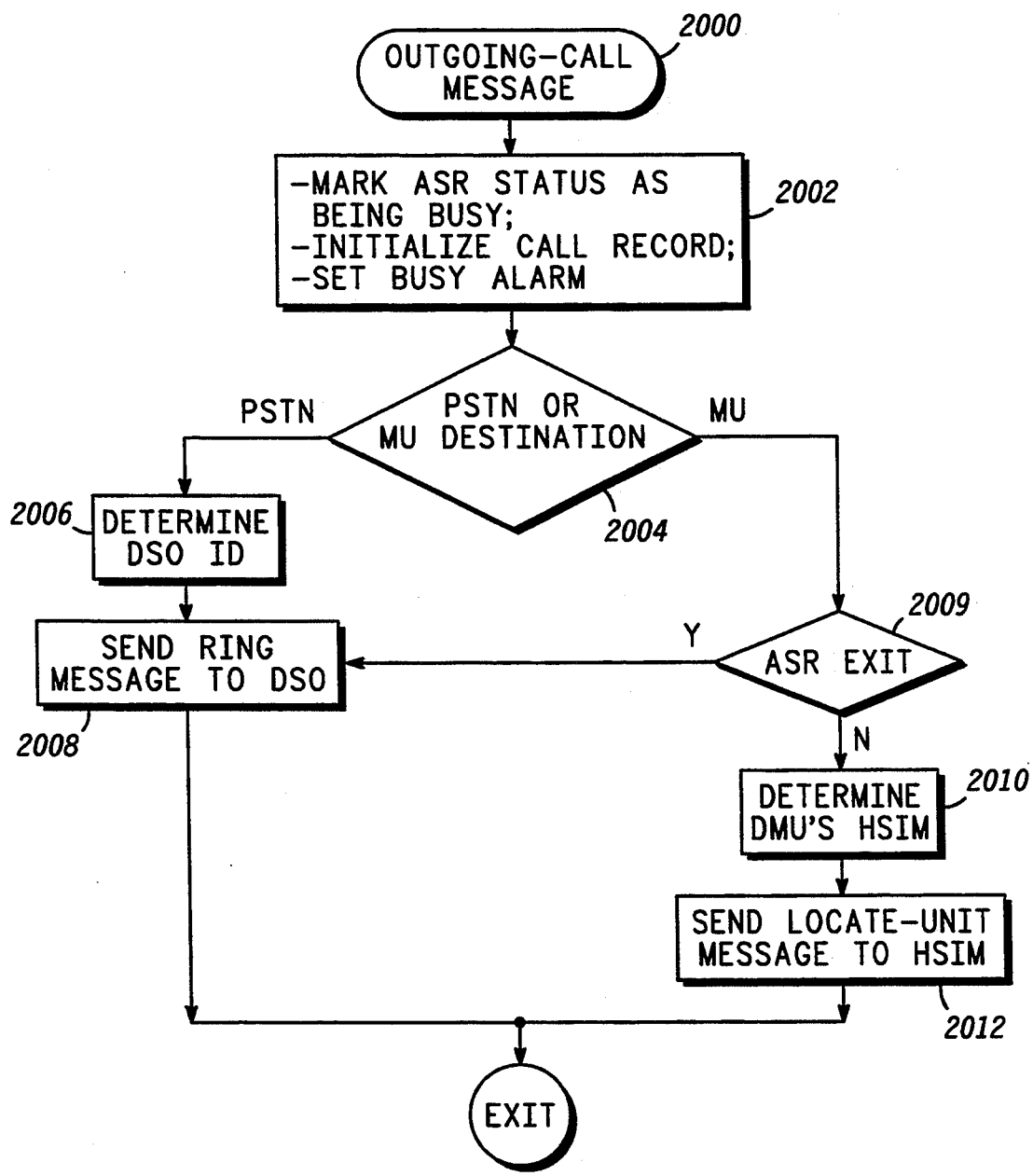

FIG. 20 shows a flow chart of an Outgoing-Call message procedure 2000. SO 400 performs procedure 2000 when an Outgoing-Call message 518, discussed above in connection with MU procedure 1300, is received. Message 518 is received at a SO 400 from a MU 300 that is attempting to originate a call (an OMU). Message 518 identifies OMU 300 and provides a destination ID, which identifies the party being called. Procedure 2000 is also performed when a call is received from PSTN 114. When SO 400 performs procedure 2000, it acts as a call originating SO (OSO).

Procedure 2000 initially performs a task 2002. When procedure 2000 is originating a call from an OMU 300 rather than PSTN 114, task 2002 marks status data element 602 of the OMU's ASR 600 as being busy. In addition, task 2002 initializes a call record for the upcoming call. This call record preferably includes data conventionally included in telephony call records. Such call records are used for billing purposes and for obtaining network usage statistics. Task 2002 may additionally set a busy alarm. The busy alarm represents a timer which will expire at a predetermined time and provide a busy alarm message to Executive procedure 1500. This alarm is set so that if the call cannot be setup within a predetermined period of time, OMU 300 will receive a busy signal.

After task 2002, a query task 2004 determines whether the destination ID included with message 518 indicates a PSTN number or an ID of another MU 300 (a DMU). When message 518 identifies a PSTN phone number, a task 2006 performs a table look-up operation to determine which DSO 400 serves the phone number. After task 2006, a task 2008 sends a Ring message 522 from the OSO 400 performing task 2008 to this DSO 400. Ring message 522 conveys an ID for the OSO 400 sending message 522 and the destination ID of the party being called. After task 2008, program control exits procedure 2000 and returns to Executive procedure 1500.

Those skilled in the art will appreciate that a single SO 400 may serve the roles of OSO and DSO for a single call. When messages are sent between an OSO and a DSO that are actually the same SO 400, they may simply be placed in a message queue managed by Executive procedure 1500. Such messages will be processed by SO 400 in due course.

When task 2004 determines that the called party is a DMU 300, a query task 2009 investigates the ASR database of OSO 400 to determine if it includes an ASR 600 for DMU 300. A large percentage of calls are made locally. Thus, a large probability exists that OSO 400 can also serve as DSO 400. If an ASR 600 exists for DMU 300, then DMU 300 has been located and SO 400 may serve the roles of both OSO and DSO. If an ASR 600 exists for DMU 300, task 2008 is performed to send Ring message 522 to DSO 400 by placing message 522 in the message queue managed by Executive procedure 1500. For a large percentage of calls placed to DMUs 300, task 2009 saves network resources and reduces call setup time because it eliminates the need for additional network communications.

When task 2009 determines that an ASR 600 does not exist for DMU 300, a task 2010 determines the HSIM 118 to which the DMU 300 is assigned. As discussed above, this determination may be made by evaluating a portion of the DMU's ID. After task 2010, a task 2012 sends a Locate-Unit message 524 to that HSIM 118. Message 524 will cause that HSIM 118 to respond by telling OSO 400 of the location of DMU 300 so that OSO 400 may then continue with the call setup process.

In sending message 524, or any message, to a HSIM 118, those skilled in the art will appreciate that network 122 may be used in communicating the message. However, as discussed above, in one embodiment of the present invention one HSIM 118 and one SO 400 represent diverse logical entities that are embodied in one set of physical hardware. Accordingly, in this embodiment task 2012 may desirably evaluate the address of the HSIM 118 to which the message is directed. If that HSIM 118 is the logical partner of the OSO 400 performing task 2012, OSO 400 may simply place the message in an appropriate queue for the partner HSIM 118 for evaluation in due course. After task 2012, program control exits procedure 2000 and returns to Executive procedure 1500.

Figure 21:
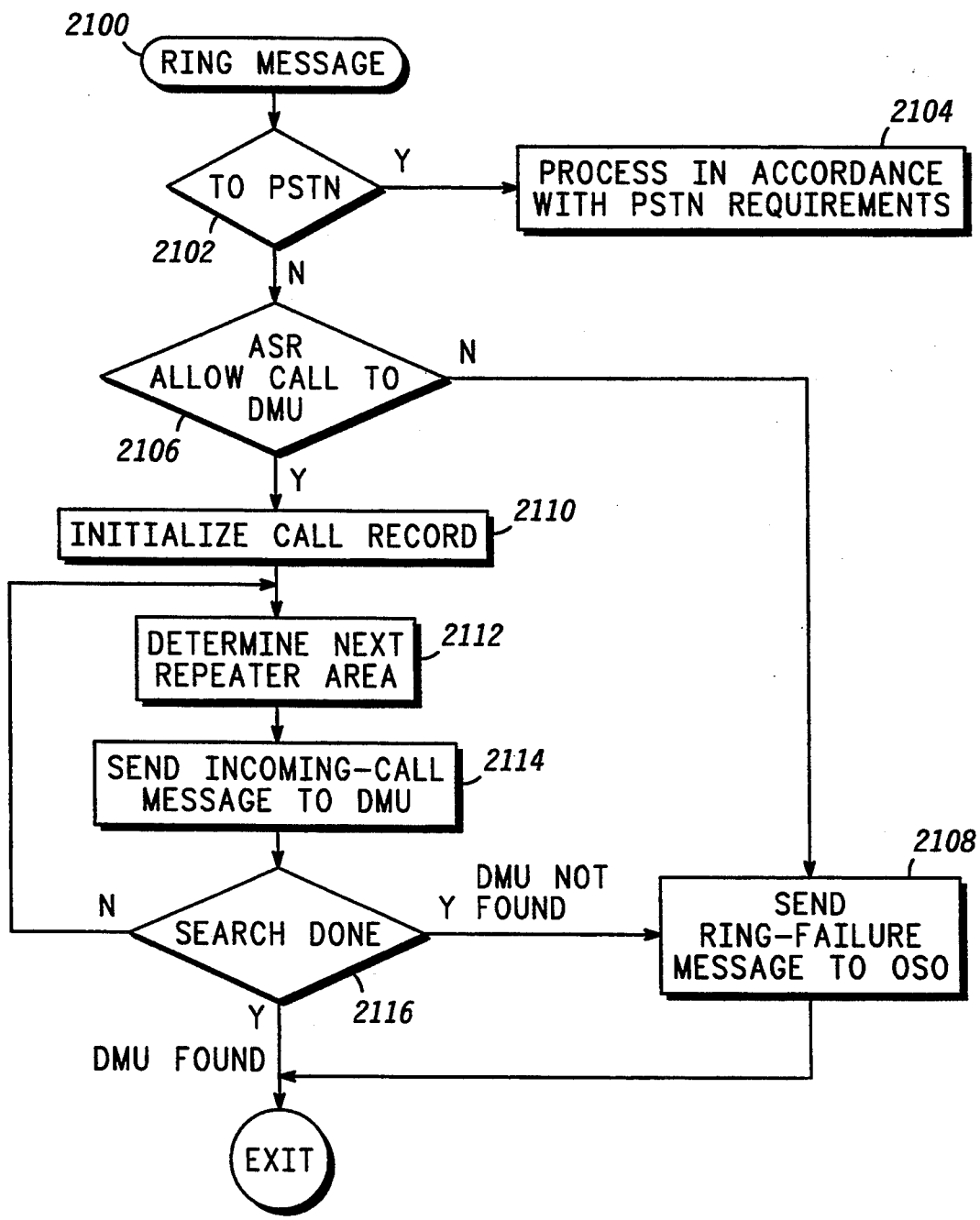

FIG. 21 shows a flow chart of a Ring message procedure 2100. SO 400 performs procedure 2100 when a Ring message 522, discussed above in connection with Outgoing-Call Message procedure 2000, is received. Message 522 is received at a SO 400 from an OSO 400 that is attempting to originate a call. Message 522 is routed to a SO 400 because the SO 400 has been determined to be the destination SO 400 (DSO) for a call that is being setup. DSO 400 may provide access to PSTN 114 or a DMU 300. Message 522 carries data that identify the OSO 400 which sent message 522 and provide a destination ID. The destination ID identifies the party being called.

Procedure 2100 initially performs a query task 2102. Task 2102 examines the destination ID carried by message 522 to determine whether the call is destined for PSTN 114 or a DMU 300. If the call is destined for a PSTN phone number, a task 2104 processes the call in a manner consistent with the requirements of the PSTN. For example, task 2104 may desirably "dial" the phone number indicated by the destination ID from message 522. Of course, those skilled in the art will appreciate that dialing a phone number includes the application of dual tone multifrequency (DTMF) or other signaling tones to PSTN 114. A call record may be initialized to keep track of the call for billing and statistical purposes. The PSTN may be monitored to determine whether a busy signal, a ringing signal, or an answer results from dialing the PSTN phone number. If a busy signal is detected, then a Ring-Failure message 526 may be returned to OSO 400. Ring-Failure message 526 will be discussed in more detail below. If the call is answered, Call-Connected message 516 may be returned to OSO 400.

If task 2102 determines that the call is destined for a DMU 300, then a query task 2106 examines the ASR database of DSO 400 to determine if an ASR 600 for the identified DMU 300 indicates that a call may be placed to the DMU 300. The call may not be cleared for placement to the identified DMU 300 for several reasons. For example, no ASR 600 may exist for the DMU 300, or the DMU's ASR 600 may indicate a pending or busy status at data element 602. Features data element 608 may be evaluated to determine if DMU 300 does not have a ring-through feature. If any of these conditions are detected, then a task 2108 sends Ring-Failure message 526 back to OSO 400. Message 526 preferably includes the DMU's ID and a code which describes the type of Ring-Failure encountered. After task 2108, program control exits procedure 2100 and returns to Executive procedure 1500.

When task 2106 determines that the DMU's ASR 600 exists and permits a call to be placed to DMU 300, a task 2110 initializes a call record, as discussed above in connection with task 2002. Next, a task 2112 determines a repeater area to use in sending an Incoming-Call message 508 to DMU 300. When the mobile repeater nodes of network 122 are satellites 104 that project cells 204 on earth 106, task 2112 determines a satellite and cell to utilize in sending Incoming-Call message 508 to DMU 300. This determination may be made using the location data 604 stored in the DMU's ASR 600, the current time, and a list of satellite positions versus time. Of course, nothing prevents task 2112 from determining that multiple satellites 104 and/or multiple cells 204 thereof may be used for sending message 508 to DMU 300. In an alternative embodiment, task 2112 determines which satellite 104 to use in sending 508 to DMU 300, and that satellite 104 determines the cell(s) to use in locating DMU 300. After task 2112, a task 2114 sends Incoming-Call message 508. As discussed above, message 508 carries the ID of DMU 300, is broadcast over a satellite's broadcast control channel (BCCH), and informs the identified DMU 300 of the incoming call.

Network 122 may not be able to precisely predict which satellite(s) and cell(s) are best for use in sending message 508. The lack of precision may be due to the fact that a DMU 300 has moved since it supplied network 122 with location data. Alternatively, the DMU 300 may be in a location which, at the instant that message 508 is to be sent to DMU 300, is near the borders of the areas covered by a cell 204 or satellite 104. When DMU 300 is near such a border, an ambiguity exists in determining which satellite 104 and cell 204 carry the BCCH that DMU 300 is monitoring. Accordingly, the call setup process of the present invention contemplates the use of a searching technique to provide adequate assurances that DMU 300 will receive message 508.

A query task 2116 determines whether the search for DMU 300 is now finished. The search may be finished when either DMU 300 sends Unit-Found message 510 to DSO 400, discussed below, or when network 122 concludes that DMU 300 probably cannot be reached at the current time and that further attempts will waste an excessive amount of network resources. DMU 300 may not be reachable for various reasons. For example, DMU 300 may have been carried into a basement or other structure which interferes with reception.

When task 2116 determines that the search may continue, program control is looped back to task 2112, which selects another satellite and/or cell to use in sending message 508 to DMU 300. With reference to FIG. 2, a first attempt at sending message 508 may desirably be directed to the cell 204 where location data 604 of ASR 600 places DMU 300. If Unit-Found message 510 is not received within a predetermined period of time, typically on the order of 200 msec. or less, then the six cells 204 that surround this cell may be used, either concurrently or in succession, in sending message 508. If Unit-Found message 510 is still not returned, task 2116 may, but need not, conclude that the search is now done.

If task 2116 concludes that the search is finished, program control proceeds in one of two different directions. If the search finishes because Unit-Found message 510 has been received, then program control simply exits procedure 2100 and returns to Executive procedure 1500. If the search finishes because no Unit-Found message 510 has been received after several different cells 204 have been used in sending Incoming-Call message 508 to DMU 300, program control proceeds to task 2108. Task 2108 sends Ring-Failure message 526 back to OSO 400.

Figure 22:
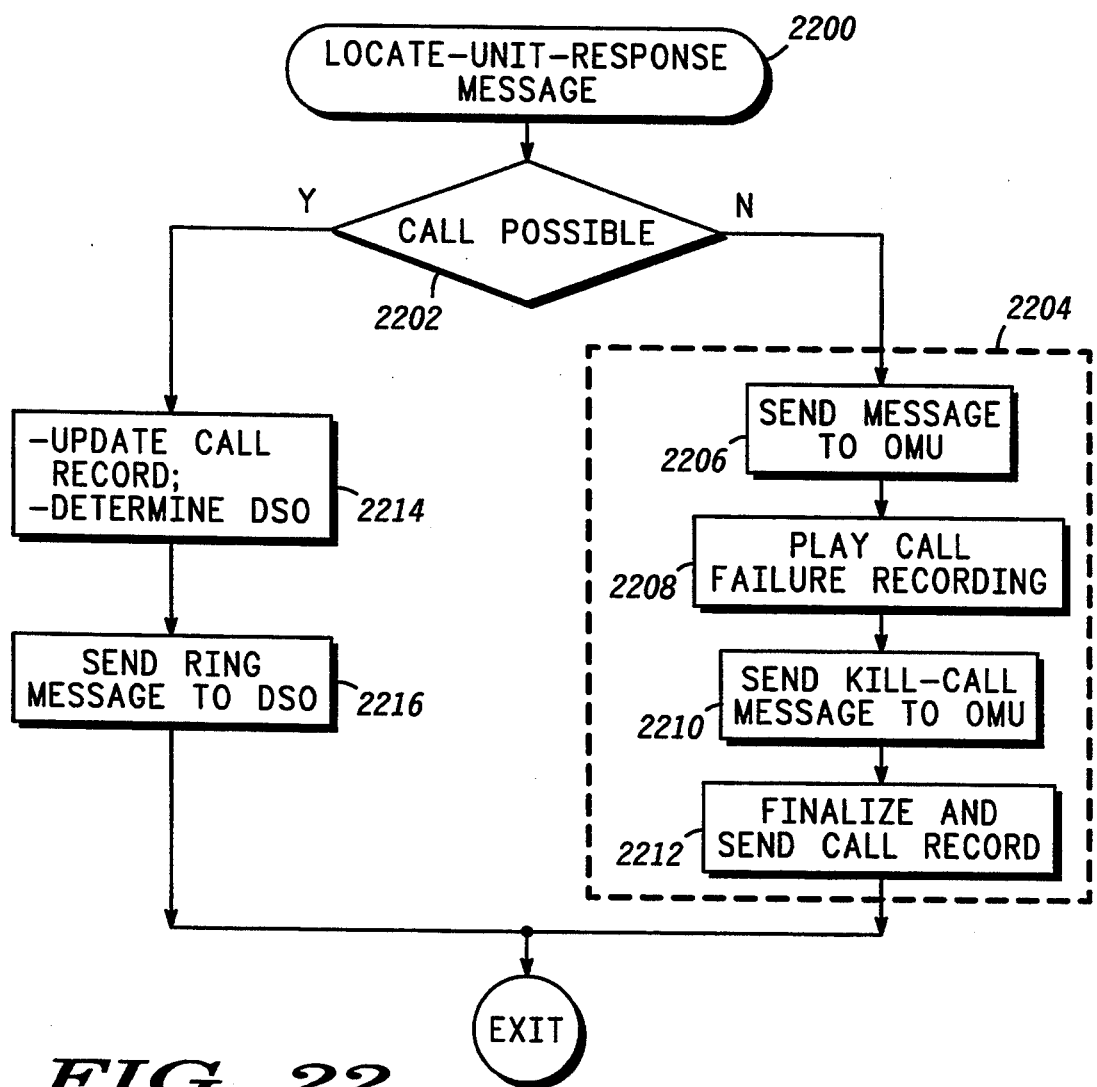

FIG. 22 shows a flow chart of a Locate-Unit-Response message procedure 2200. SO 400 performs procedure 2200 when a Locate-Unit-Response message 528 is received from a HSIM 118. As discussed above in connection with Outgoing-Call message procedure 2000, when a SO 400 acting as an OSO receives a request to setup a call to a DMU 300, it sends Locate-Unit message 524 to the DMU's HSIM 118 to learn the DMU's current location. Locate-Unit-Response message 528 is the HSIM's response to Locate-Unit message 524. When SO 400 performs procedure 2200, it is acting in its OSO capacity. Locate-Unit-Response message 528 carries the DMU's ID. It also carries at least one of two other items of information. If DMU 300 is logged on network 122, message 528 conveys the location of DMU 300. If DMU 300 is not logged on network 122, message 528 conveys the fact that it is not logged on.

Procedure 2200 initially performs a query task 2202. Task 2202 examines the received message 528 to determine if a call is possible. A call is considered not possible if the DMU 300 to which the call is directed is logged off network 122, in which case the DMU 300 cannot be reached. When the call is not possible, a call setup failure routine 2204 is performed. Routine 2204 first desirably performs a task 2206, which sends a message to the party attempting to place the call. This party may be OMU 300 or a PSTN device. Task 2206 may be omitted for a PSTN placed call. The message sent in task 2206 may cause satellite 104 and OMU 300 to assign a channel over which real time voice communication may take place. Next, a task 2208 plays or initiates an appropriate call failure recording over an appropriate channel if to an OMU 300 or to a PSTN line if to a PSTN device. The recording may, for example, verbally inform the caller that the called party cannot be reached at the present time.

After task 2208 has played or initiated the recording (which may be stored internally in the OMU), a task 2210 sends Kill-Call message 512 if the call is being placed by OMU 300. Task 2210 interrupts or "hangs up" the PSTN line if the call is being placed by a PSTN device. Next, a task 2212 finalizes and sends the call record previously initialized in connection with this call, as discussed above in connection with task 2002. The call record need not be sent at once but may be collected with other call records and sent in a batch at a convenient time. The call record is preferably sent to a node of network 122 which is designated for collecting and processing call records originated by OSO 400. Nothing prevents the hardware in which SO 400 is embodied from additionally performing this call record processing function as yet another logical entity partner to SO 400. After task 2212, program control exits routine 2204 and procedure 2200, and program control returns to Executive routine 1500. The call setup process has been terminated.

When task 2202 determines that Locate-Unit-Response message 528 conveys information suggesting that DMU 300 is logged on network 122, a task 2214 updates the call record established for this call and determines which SO 400 is the DSO for this call. This determination may be made by examining the location data carried by message 528. As discussed above, this location data may desirably represent the address of the SO 400 that is currently serving the DMU 300. However, OSO 400 may convert any other format of location data, such as latitude/longitude data, into an address for DSO 400 through a table look-up operation.

After task 2214, a task 2216 sends Ring message 522 to DSO 400. Ring message 522 was discussed above in connection with procedures 2000 and 2100. When DSO 400 receives message 522, it performs Ring message procedure 2100, discussed above. After task 2216, program control exits procedure 2200 and returns to Executive procedure 1500.

Figure 23:
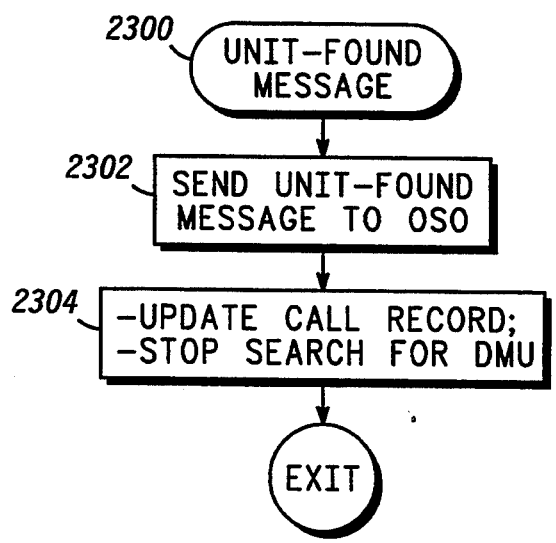

FIG. 23 shows a flow chart of a Unit-Found message procedure 2300. SO 400 performs procedure 2300 when a Unit-Found message 510 is received from a DMU 300. As discussed above in connection with MU procedure 1200, when a DMU 300 receives Incoming-Call message 508, it responds with Unit-Found message 510. Unit-Found message 510 conveys the identity of DMU 300.

Procedure 2300 performs a task 2302 to send Unit-Found message 510 on to the OSO 400 if SO 400 is acting the part of the call's DSO. A task 2304 updates the call record kept by DSO 400 and stops any searching for DMU 300 being performed by tasks 2112-2114 of procedure 2100. Although not specifically shown in FIG. 23, an OSO 400 receiving message 510 may update its call record and alter any user feedback it is providing to the person originating the call. After tasks 2302-2304, program control exits procedure 2300 and returns to Executive procedure 1500.

FIG. 24 shows a flow chart of an Off-Hook message procedure 2400. SO 400 performs procedure 2400 when an Off-Hook message 514 is received from a DMU 300. As discussed above in connection with MU procedure 1200, a DMU 300 responds with Off-Hook message 514 when a user of DMU 300 answers the call. Off-Hook message 514 conveys the identity of DMU 300.

If procedure 2400 is being performed by a DSO 400, a task 2402 sends Off-Hook message 514 on to OSO 400. DSO 400 may append a routing code to message 514. This routing code can be used in routing call traffic to DMU 300. OSO 400 will then perform procedure 2400. OSO 400 may perform task 2402 to provide a routing code for use in routing call traffic to OMU 300 to the destination end of the call. A task 2404 updates the call record to indicate that the call is now being established and stops any busy alarms, discussed above in connection with task 2002, that may be set with respect to this call. A task 2406 sends Call-Connected message 516 to the MU 300 being serviced. MU 300 is the DMU when a DSO 400 performs procedure 2400 and the OMU when an OSO 400 performs procedure 2400.

As discussed above, message 516 will, when received at the OMU and DMU, include data that assigns a traffic channel (TCH) to the call. Of course, in the preferred embodiment the traffic channels used by an OMU and DMU are governed by the satellites 104 with which the OMU and DMU are communicating, and the OMU and DMU will have their own respective traffic channels. This assignment data may be determined by the SOs 400 or by the satellites 104 which are currently involved in the call and directly communicating with the MUs 300. After task 2406, program control exits procedure 2400 and returns to Executive procedure 1500. The call is now setup from the perspective of SOs 400. Those skilled in the art will appreciate that the call itself need not be routed through the SOs 400 which control the call.

FIG. 25 shows a flow chart of a Ring-Failure message procedure 2500. SO 400 performs procedure 2500 when a Ring-Failure message 526 is received from a DSO 300. As discussed above in connection with SO procedure 2100, a DSO 400 sends Ring-Failure message 526 to OSO 400 when it determines that the call cannot be setup. Message 526 conveys the ID of DMU 300 and an indication of the reason why the call cannot be setup. Procedure 2500 performs call failure routine 2204, discussed above. The recording played at task 2208 within routine 2204 may desirably indicate a cause for not being able to setup the call. After routine 2204, program control exits procedure 2500 and returns to Executive procedure 1500.

FIG. 26 shows a flow chart of a Kill-Call message procedure 2600. SO 400 performs procedure 2600 when a Kill-Call message 512 is received. Message 512 may be received from a MU 300 or another SO 400 and may be received while SO 400 is acting as an OSO or a DSO. As discussed above, Kill-Call message 512 indicates that the call setup process, or call if it is in progress, needs to be terminated.

Procedure 2600 performs a task 2602 to finalize and send the call record SO 400 has been making with respect to the present call. A task 2604 stops all in-progress processes related to the call. Such processes may, for example, be the search for DMU 300 discussed above in connection with procedure 2100, the busy alarm discussed above in connection with procedure 2000, or the playing of a recording in task 2208 of routine 2204. A task 2606 sends the Kill-Call message 512 on to either its served MU 300 or partner SO 400 in the present call. After tasks 2602-2606, program control exits procedure 2600 and returns to Executive procedure 1500.

Figure 27:
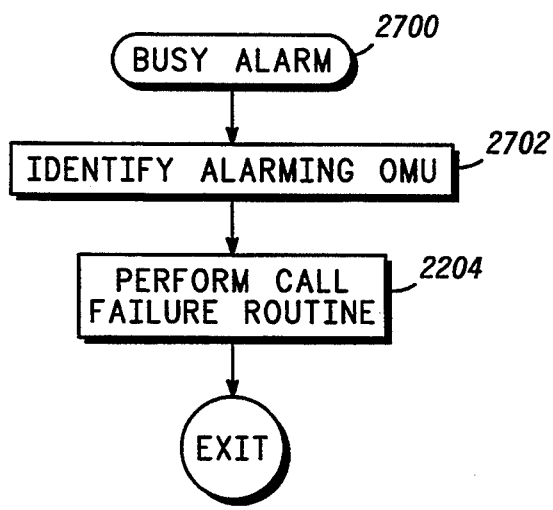

FIG. 27 shows a flow chart of a Busy Alarm procedure 2700. SO 400 acts as an OSO when it performs procedure 2700. Procedure 2700 is performed when a busy alarm message is received. The busy alarm message is generated internally by OSO 400 when a timing condition is met. As discussed above in connection with task 2002, a busy alarm is set when a call is being originated. If the call cannot be setup by the time that the busy alarm message is received, then procedure 2700 is performed.

A task 2702 identifies the OMU 300 to which the busy alarm message relates. Next, procedure 2700 performs call failure routine 2204, discussed above. The recording played at task 2208 in routine 2204 may simply play a conventional busy tone or may play a voice message which explains the problem encountered in setting up the call. After routine 2204, program control exits procedure 2700 and returns to Executive procedure 1500.

FIGS. 28-32 show flow charts of procedures performed by SIM 118 in support of the call setup process. Generally speaking, a SIM 118 maintains a database of subscriber records 700, as shown in FIG. 7, related to only a portion of the entire population of MUs 300. To those MUs 300 for which the SIM 118 maintains a subscriber record 700, the SIM is considered the home SIM 118 (HSIM). SIM 118 receives and responds to various messages to support the call setup process. These messages are received from SOs 400. Some messages may be passed on to SIM 118 from MUs 300 and other messages are originated at SOs 400. Those skilled in the art will appreciate that SIMs 118 may engage in numerous other activities related to the operation of network 122 other than call setup.

Figure 28:
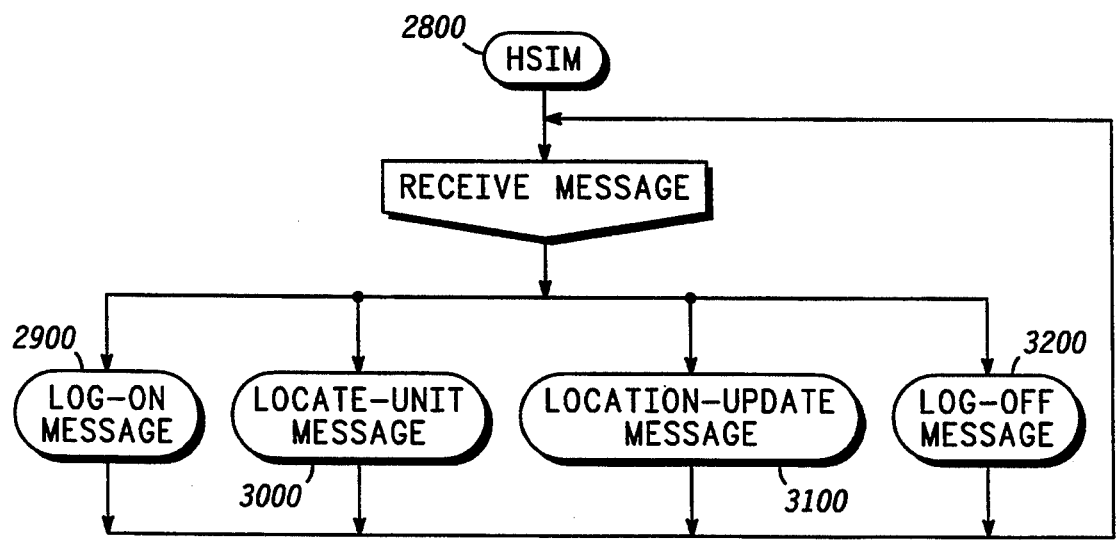
FIGS. 28–32 show flow charts of procedures performed by subscriber information managers to support call setup within the environment illustrated in FIG. 1.

FIG. 28 shows a flow chart of a SIM Executive procedure 2800 which SIM 118 performs in support of the call setup process. Procedure 2800 examines messages received at SIM 118 and switches program control to an appropriate procedure to respond to the received message. Those skilled in the art will appreciate that all procedures controlled by procedure 2800 may be reentrant. FIGS. 29-32 present flow charts of these procedures.

Figure 29:
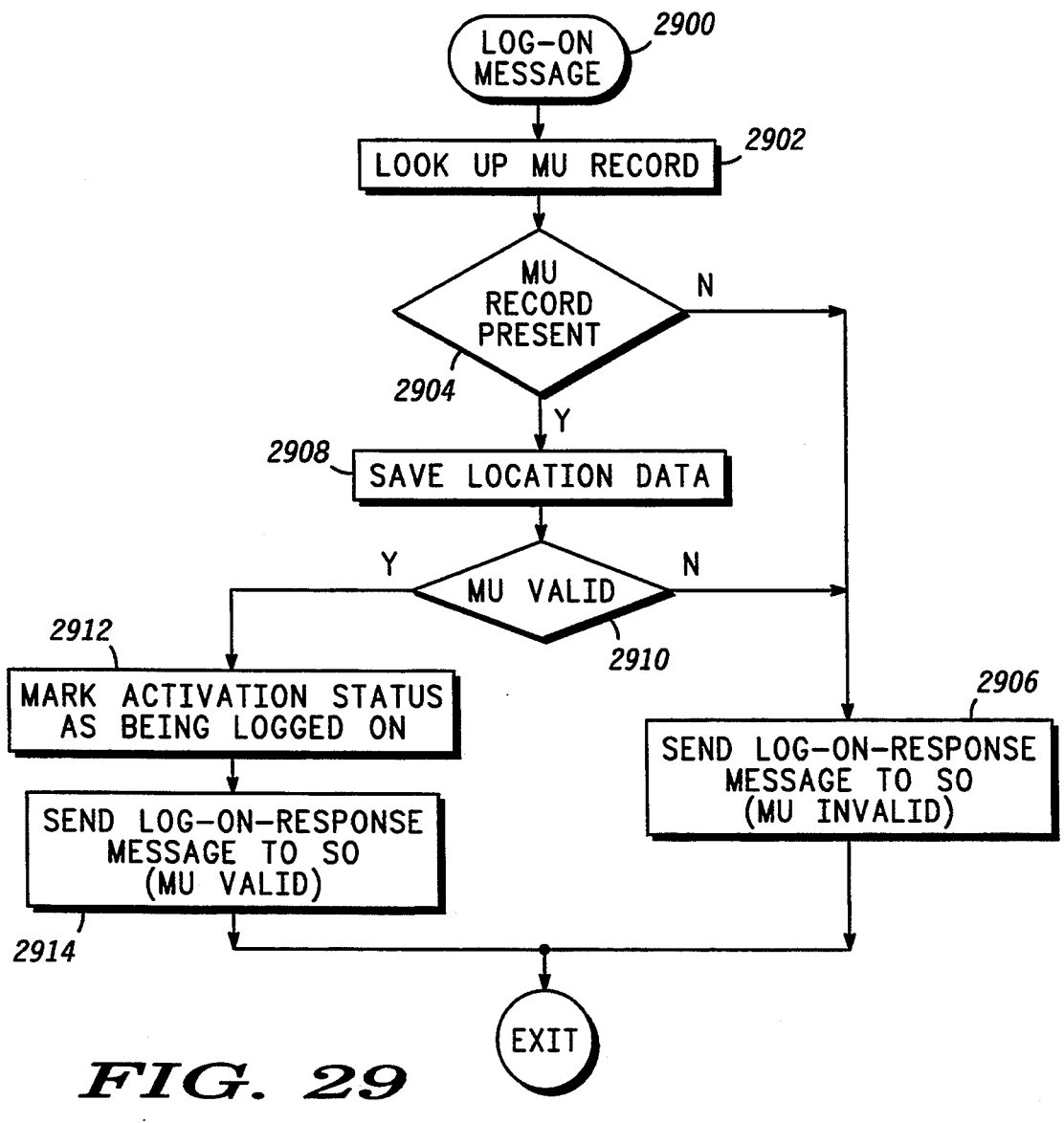

FIG. 29 shows a flow chart of a Log-On message procedure 2900. SIM 118 performs procedure 2900 when a Log-On message 502, discussed above in connection with MU procedure 800 and SO procedure 1600, is received. The receipt of Log-On message 502 indicates that a MU 300 is attempting to access network 122 to receive communication services.

Procedure 2900 performs a task 2902 to look up the subscriber record 700 for the MU 300 identified by message 502. After task 2902, a query task 2904 determines whether task 2902 was successful in finding the MU's subscriber record 700. If no subscriber record is present, a task 2906 constructs and sends Log-On-Response message 504 back to the SO 400 which passed Log-On message 502 on to SIM 118. Message 504 will communicate the fact the MU 300 is considered invalid and that access is denied by network 122. After task 2906, program control exits procedure 2900 and returns to SIM Executive procedure 2800. The MU 300 is not logged on network 122, and the MU 300 will not receive communication services through network 122.

When task 2904 determines that a subscriber record exists for MU 300, a task 2908 saves or updates, in a data element 702 of subscriber record 700, the location data that Log-On message 502 provides. After task 2908, a query task 2910 determines whether MU 300 is valid. The validity check of task 2910 serves a purpose similar to that of the authentication test discussed above in connection with SO procedure 1600. Subscriber record 700 may include a data element 704 which task 2910 accesses and which conveys validation parameters. Data element 704 may be supplied by user input through I/O section 406 of SIM 118. The validation parameters may indicate that the subscriber to whom MU 300 is registered is not paying his or her bills for the services offered by network 122. In addition, the validation parameters may indicate that services are not to be allowed when users are located in certain areas, and task 2910 can evaluate these areas with respect to the location data stored in data element 702. When these and other considerations indicate that MU 300 is not valid, task 2906 is performed to return a Log-On-Response message 504 that denies access to network 122.

When task 2910 determines that MU 300 is a valid MU that should be allowed access to network 122, a task 2912 marks an activation status data element 706 of the MU's subscriber record 700 as being logged on. Next, a task 2914 constructs and sends Log-On-Response message 504 back to the SO 400 indicated in the received Log-On message 502. This time, Log-On-Response message 504 includes features data from a data element 708 of subscriber record 700. These features are discussed above in connection with SO procedure 1600. The features are entered into the MU's subscriber record 700 when service for MU 300 is initially registered with network 122 or thereafter updated. After task 2914, program control exits procedure 2900 and returns to Executive procedure 2800. MU 300 is now logged on network 122.

Figure 30:
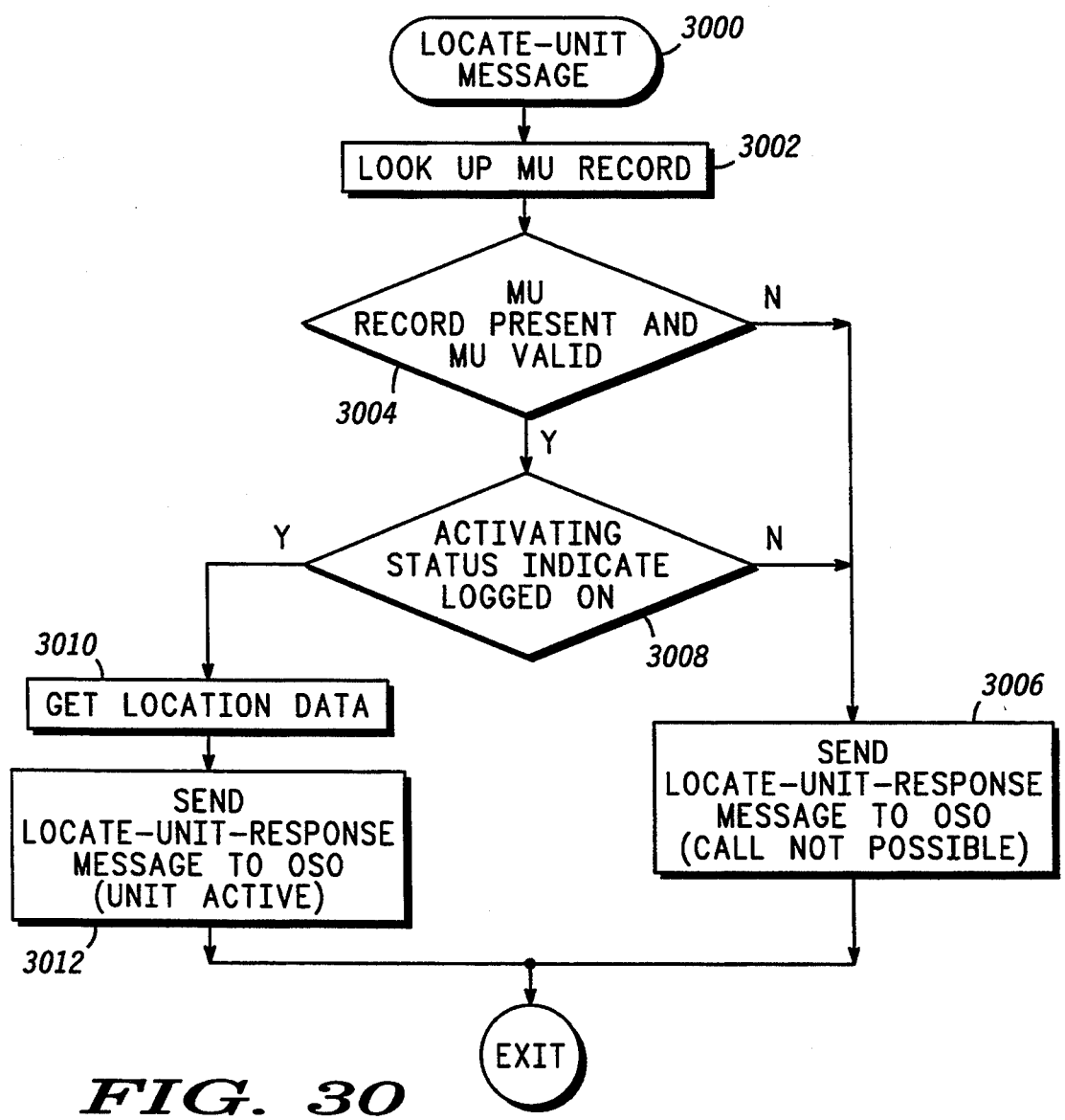

FIG. 30 shows a flow chart of a Locate-Unit message procedure 3000. SIM 118 performs procedure 3000 when a Locate-Unit message 524 is received. As discussed above in connection with SO procedure 2000, an OSO 400 sends a SIM 118 message 524 when a call is being setup to a DMU 300. Message 524 identifies the DMU to whom the call is being placed and the OSO 400 from whom message 524 is being sent.

Procedure 3000 performs a task 3002 to look up the DMU's subscriber record 700. A query task 3004 determines whether a record 700 exists for DMU 300 and whether the DMU is valid for this call. Validity parameters 704 may be consulted to determine whether the DMU is valid. A DMU may be considered invalid if, for example, the OSO 400 requesting the location of the DMU 300 is located in a region which has not been cleared to communicate to a MU 300 located where DMU 300 is currently located. If task 2804 determines that a subscriber record 700 for DMU 300 is not present or indicates an invalid DMU 300, then a task 3006 constructs and sends Locate-Unit-Response message 528, discussed above in connection with SO procedure 2200. Message 528 is sent to the OSO 400 that sent the received Locate-Unit message 524. In this situation, message 528 conveys the fact that a call may not be setup to the specified DMU 300.

When task 3004 determines that the specified MU 300 has a subscriber record 700 and is valid for receiving a call, a query task 3008 determines whether MU 300 is currently logged on network 122. This determination may be made by examining data element 706 of the DMU's subscriber record 700. If DMU 300 is not logged on, task 3006 sends message 528 to convey the fact that DMU 300 is not available for receiving calls and that a call may not be setup to DMU 300. If DMU 300 is logged on, a task 3010 obtains location data from data element 702 of the specified DMU's subscriber record 700, and a task 3012 formats and sends Locate-Unit-Response message 528 to the OSO 400 that sent the received Locate-Unit message 524. Task 3012 includes the location data obtained in task 3010 in message 528 and conveys the fact that DMU 300 is currently logged on network 122. After task 3012, program control exits procedure 3000 and returns to Executive procedure 2800.

Figure 31:
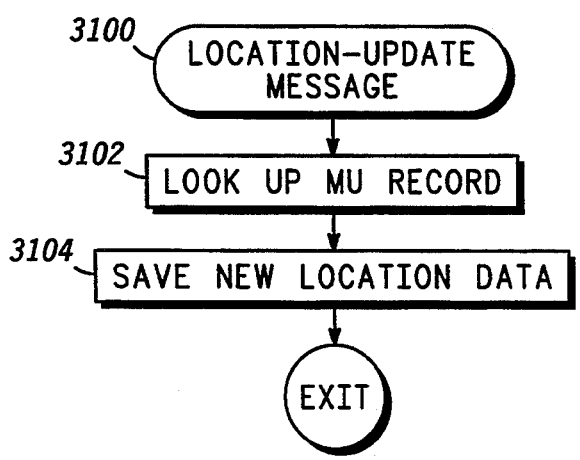

FIG. 31 shows a flow chart of a Location-Update message procedure 3100. SIM 118 performs procedure 3100 when a Location-Update message 506 is received. As discussed above in connection with MU procedure 1000 and SO procedure 1800, a MU 300 originates Location-Update message 506 from time to time to automatically inform network 122 of its current location. Message 506 identifies the MU 300 which is reporting its location and includes data describing its current location.

Procedure 3100 performs a task 3102 to look up a subscriber record 700 for the MU 300 making the location report. Presumably, a record 700 exists because such location reports are made while MU 300 is logged on network 122. However, those skilled in the art will appreciate that various error checking and reporting schemes can be implemented in accordance with task 3102 to address mistakes. After task 3102, a task 3104 saves the location data included with message 506. Task 3104 saves this location data in the MU's subscriber record 700 at data element 702. After task 3104, program control exits procedure 3100 and returns to Executive procedure 2800.

Figure 32:
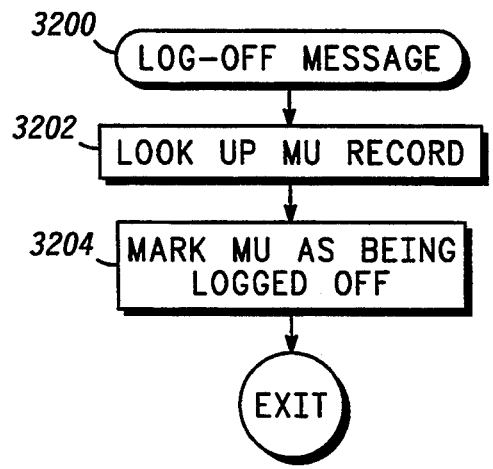

FIG. 32 shows a flow chart of a Log-Off message procedure 3200. SIM 118 performs procedure 3200 when it receives a Log-Off message 520. As discussed above in connection with MU procedure 1400 and SO procedure 1800, a MU 300 originates Log-Off message 520 before it de-energizes to automatically inform network 122 that it is not going to be available to receive calls. Message 520 identifies the MU 300 which is reporting its logging off condition.

Procedure 3200 performs a task 3202 to look up a subscriber record 700 for the MU 300 making the logging off report. Record 700 presumably exists because logging off reports are made from MUs 300 that are logged on network 122. After task 3202, a task 3204 marks activation status data element 706 of the MU's subscriber record 700 as being logged off. After task 3204, program control exits procedure 3200 and returns to Executive procedure 2800. Until MU 300 logs back on network 122, calls directed to MU 300 will be blocked through procedure 3000 without consuming additional network resources.

In summary, the present invention provides an improved call setup process which is adapted for use with mobile end users. MUs 300 automatically determine their current locations and report these locations to network 122. Network 122 keeps track of these locations and makes this information available to the relevant OSOs 400 which are attempting to setup calls to DMUs 300.

Moreover, the call setup process of the present invention is adapted for use in connection with a network 122 having mobile nodes, such as satellites 104. The location information is used by SOs 400 in making initial selections regarding which of numerous available mobile node resources to use for communication with MUs 300. Moreover, the bulk of call setup intelligence is preferably retained in SOs 400 and SIMs 118, which are more easily serviced that orbiting satellites 104.

The call setup process of the present invention is also adapted to conserve network resources and to complete call setup quickly. Each message communicated within environment 100 consumes some of the resources of network 122. The total number of messages communicated in setting up calls is minimized in the present invention. Information, such as validity and features, supporting call setup is maintained at outlying SOs 400 which are serving MUs 300 rather than being held at HSIMs 118. Accordingly SOs 400 may setup many types of calls quickly and without consulting a HSIM 118. When calls cannot be setup, the decisions to declare setup process failures are made quickly and with few internal network communications. The present invention has been described above with reference to preferred embodiments. However, those skilled in the art will recognize that changes and modifications may be made in these preferred embodiments without departing from the scope of the present invention. For example, messages and data elements discussed herein may include additional information not specifically discussed herein. Date and time stamps are likely candidates to be included in such additional information even though such stamps have no direct bearing on call setup. In addition, alternate position determining systems, such as LORAN or other systems and methods known to those skilled in the art, may be utilized by MUs 300 in determining their locations. Moreover, the mobile repeater nodes of network 122 need not be limited to satellites but may be terrestrial or airborne nodes. These and other changes and modifications which are obvious to those skilled in the art are intended to be included within the scope of the present invention.

What is claimed is:

1. A method of operating a mobile unit for communication to facilitate setting up calls for said mobile unit for communication which are accessible through a communications network, said method comprising steps of:

determining a location of said mobile unit;

reporting said location of said mobile unit to said communication network over a communication channel;

receiving a log-on message by said mobile unit, said log-on message transmitted from said network over said communication channel, said log-on message informing said mobile unit that said mobile unit may engage in said setting up calls;

keeping track of a current location for said mobile unit;

determining when said current location causes a predetermined threshold distance to be exceeded; and repeating said reporting step when said threshold is exceeded.

2. A method of operating a mobile unit for communication to facilitate setting up calls for said mobile unit for communication which are accessible through a communications network, said method comprising steps of:

determining a location of said mobile unit;

reporting said location of said mobile unit to said communication network over a communication channel;

receiving a log-on message by said mobile unit, said log-on message transmitted from said network over said communication channel, said log-on message informing said mobile unit that said mobile unit may engage in said setting up calls;

gaining synchronization by said mobile unit with said communication channel of said network, said gaining step occurring before said reporting step; and losing synchronization with said communication channel after said receiving step.

3. A method as claimed in claim 2 wherein:

said communication channel is a TDMA channel established at a mobile repeater of said network; and said method additionally comprises a step of maintaining time slot synchronization with said communication channel between said reporting and receiving steps.

4. A method as claimed in claim 2 additionally comprising, after said losing step, a step of monitoring a broadcast control channel to detect an incoming call.

5. A method as claimed in claim 4 wherein:
said monitoring step comprises a step of keeping an account of when said broadcast control channel becomes unavailable; and
said method additionally comprises steps of:
evaluating said account to determine when a predetermined threshold of unavailability is exceeded; and
repeating said determining a location, gaining, and reporting steps when said threshold is exceeded.

6. A method as claimed in claim 4 additionally comprising, in response to said monitoring step, steps of:
obtaining an incoming-call message from said network, said incoming-call message identifying said mobile unit and informing said mobile unit that a call is being directed to said mobile unit; and
sending a unit-found message to said network in response to said incoming-call message, said unit-found message informing said network that said mobile unit has been located so that said call may be routed thereto.

7. A method as claimed in claim 6 additionally comprising, before said sending step, a step of gaining synchronization with a communication channel of said network.

8. A method as claimed in claim 6 additionally comprising, after said obtaining step, a step of initiating a ringing sequence to inform a user of said incoming call.

9. A method as claimed in claim 8 additionally comprising steps of:
detecting an off-hook condition at said mobile unit; and
sending an off-hook message to said network in response to said detecting step.

10. A method of operating a mobile unit for communication to facilitate setting up calls between said mobile unit and other mobile units for communication which are accessible through a communications network, said method comprising steps of:
determining a location of said mobile unit;
reporting said location of said mobile unit to said communication network over a communication channel;
receiving a log-on message by said mobile unit, said log-on message transmitted from said communication network over said communication channel, said log-on message informing said mobile unit that said mobile unit may engage in said setting up calls;
wherein said mobile unit includes a user input device for identifying said other units and for identifying when to place an outgoing call to one of said other mobile units;
losing synchronization with said communication channel;
monitoring said user input device to detect a command for placing an outgoing call;
gaining synchronization with said communication channel of said communication network; and
sending an outgoing-call message to said communication network, said outgoing-call message informing said communication network of a request to place a call from said mobile unit and of an identify of one of said other mobile units.

11. A method of operating a mobile unit for communication to facilitate setting up calls between said mobile unit and other mobile units for communication which are accessible through a communications network, said method comprising steps of:
determining a location of said mobile unit;
reporting said location of said mobile unit to said communication network over a communication channel;
receiving a log-on message by said mobile unit, said log-on message transmitted from said communication network over said communication channel, said log-on message informing said mobile unit that said mobile unit may engage in said setting up calls;
wherein said mobile unit includes a user input device for controlling the energization of said mobile unit;
monitoring said user input device to detect a command to de-energize said module unit;
reporting de-energization of said mobile unit to said communication network; and
de-energizing said mobile unit.

12. A method of operating a home subscriber information manager (SIM) portion of a network having a population of mobile units selectively in communication with a plurality of switching offices, and having a plurality of SIMs similar to said home SIM, said switching offices and said SIMs being in data communication with one another, and said method comprising steps of:
maintaining a database of subscriber records, each subscriber record having a mobile unit ID and activation status data associated therewith;
receiving a log-on message, said log-on message conveying a request for logging a mobile unit on said network, and said log-on message including a mobile unit ID value;
selecting one of said records in response to said mobile unit ID value from said log-on message; and
modifying said activation status data of said selected record to indicate that said mobile unit is logged on said network.

13. A method as claimed in claim 12 wherein:
said maintaining step comprises a step of including location data in each of said subscriber records;
said receiving step comprises a step of obtaining location data from said log-on message; and
said modifying step comprises a step of updating said location data of said selected record in accordance with said location data from said log-on message.

14. A method as claimed in claim 13 additionally comprising steps of:
receiving a locate-unit message, said locate-unit message including data identifying a called mobile unit and data identifying a switching office from which said locate-unit message was sent;
switching one of said records in accordance with said called mobile unit identifying data; and
sending a transmitted message to said identified switching office, said transmitted message including said location data from said selected one of said records.

15. A method as claimed in claim 14 additionally comprising steps of:
evaluating, in response to said locate-unit message, said activation status data of said selected record to determine whether said called mobile unit is currently logged on said network; and
wherein sending a transmitted message includes a step of sending, when said called mobile unit is not currently logged on said network, a transmitted message to said identified switching office informing said switching office that said called mobile unit cannot be reached.

16. A method as claimed in claim 13 wherein said maintaining a step further comprises steps of:
receiving a location-update message, said location-update message including data identifying a mobile unit and data describing a location of said identified mobile unit;
selecting one of said records in accordance with said mobile unit identifying data; and
modifying said location data of said selected record in accordance with said location describing data form said location-update message.

17. A method as claimed in claim 12 wherein:
said receiving step comprises a step of obtaining data identifying a switching office from which said log-on message was sent; and
said method includes steps of:
evaluating said selected record to determine whether said mobile unit is a valid unit; and
sending a transmitted message to said identified switching office, said transmitted message informing said identified switching office whether said mobile unit is a value unit.

18. A method as claimed in claim 17 wherein:
said maintaining step comprises a step of including data identifying service features associated with said mobile units in each record; and
said sending step comprises a step of including said service features for said selected mobile unit in said transmitted message.

19. A method as claimed in claim 12 additionally comprising steps of:
receiving a log-off message, said log-off message including data identifying a mobile unit;
selecting one of said records in accordance with said mobile unit identifying data; and
modifying said activation status data of said selected record to indicate that said mobile unit identified by said log-off message is logged off said network.

20. A method of operating a home subscriber information manager (SIM) portion of a network having a population of mobile units selectively in communication with a plurality of switching offices, and having a plurality of SIMs similar to said home SIM, said switching offices and said SIMs being in data communication with one another, and said method comprising steps of:
maintaining a database of subscriber records, each subscriber record having a mobile unit ID and location data associated therewith;
receiving a request for logging a mobile unit on said network, said request including a mobile unit ID value and data describing a location of said mobile unit;
selecting one of said records in accordance with said mobile unit ID value from said receiving step; and
modifying said location data of said selected record to reflect said location describing data from said receiving step.

21. A method as claimed in claim 20 wherein:
said receiving step comprises a step of obtaining data identifying a switching office from which a log-on request was sent; and
said method includes steps of:
evaluating said selected record to determine whether said mobile unit is a valid unit; and
sending a transmitted message to said switching office, said transmitted message informing said switching office whether said mobile unit is a value unit.

22. A method as claimed in claim 21 wherein:
said maintaining step comprises a step of including data identifying service features associated with said mobile units in each record; and
said sending step comprises a step of including said service features for said selected mobile unit in said transmitted message.

23. A method as claimed in claim 20 additionally comprising steps of:
receiving a locate-unit message, said locate-unit message including data identifying a called mobile unit and data identifying a switching office form which said locate-unit message was sent;
selecting one of said records in accordance with said called mobile unit identifying data; and
sending a transmitted message to said switching office, said transmitted message including said location data from said selected one of said records.

24. A method as claimed in claim 20 wherein said maintaining step comprises steps of:
receiving a location-update message, said location-update message including data identifying a mobile unit and data describing a location of said identified mobile unit;
selecting one of said records in accordance with said mobile unit identifying data; and
modifying said location data of said selected record in accordance with said location describing data from said location-update message.

25. A method of operating a servicing switching office position of a network having a constellation of mobile repeaters through which communications are routed to a population of mobile units, having a plurality of switching offices similar to said servicing office, and having a plurality of subscriber information managers (SIMs), said switching offices and said SIMs being in data communication with one another, said method comprising steps of:
receiving a request for logging a mobile unit on said network, said request including a mobile unit ID value;
evaluating said mobile unit ID value to identify a SIM to which said mobile unit is assigned;
communicating with said identified SIM to obtain service data descriptive of said mobile unit; and
creating a record for said mobile unit said record including said service data.

26. A method as claimed in claim 25 additionally comprising a step of updating said record to indicate status data of said mobile unit, said status data indicating one of a busy state or a not busy state of said mobile unit.

27. A method as claimed in claim 25 additionally comprising steps of:
receiving a log-off message, said log-off message conveying a request for logging said mobile unit off said network; and
purging said record in response to said log-off message.

28. A method as claimed in claim 27 additionally comprising a step of sending a message to said SIM to inform said SIM that said mobile unit is logging off said network.

29. A method as claimed in claim 25 additionally comprising steps of:

receiving a ring message, said ring message identifying said mobile unit and instructing said servicing office to setup a call to said mobile unit;

finding said mobile unit; and determining whether said mobile unit goes to an off-hook condition.

30. A method as claimed in claim 25 additionally comprising steps of:

receiving an outgoing-call message from said mobile unit, said outgoing-call message including data identifying a party to be called and instructing said servicing office to setup a call to said party;

evaluating said identifying data to select one of said switching offices to communicate with in setting up said call; and routing a ring message to said selected switching office.

31. A method as claimed in claim 30 wherein said record of said creating step is maintained within a data base of similar records, and said evaluating step comprises steps of:

determining if a record corresponding to said identified party is present in said database; and selecting said serving office to communicate with for setting up said call when said database includes a record for said identified party.

32. A method of operating a distributed telecommunications network having a constellation of mobile repeaters through which communications are routed to a population of mobile units, having a plurality of switching offices in communication with said constellation, and having a plurality of subscriber information managers (SIMs) in communication with said constellation, said method comprising steps of:

receiving, at a servicing one of said switching offices, a request for logging a mobile unit on said network, said request including a mobile unit ID value;

evaluating, at said servicing office, said mobile unit ID value to identify a SIM to which said mobile unit is assigned;

communicating between said servicing office and said identified SIM to provide said servicing office with service data descriptive of said mobile unit; and creating, in said servicing office, a record for said mobile unit, said record including said service data.

33. A method as claimed in claim 32 additionally comprising steps of:

receiving, at said servicing office, a ring message, said ring message identifying said mobile unit and instructing said servicing office to setup a call to said mobile unit;

finding said mobile unit; and determining whether said mobile unit goes off-hook.

34. A method as claimed in claim 33 wherein said servicing office communicates with a mobile repeater having an antenna pattern which forms discrete cells, and said finding step comprises steps of:

selecting one of said discrete cells to use in sending an incoming-call message to said mobile unit;

sending said incoming-call message to said mobile unit using said selected cell; and detecting whether said mobile unit responds to said incoming-call message with a unit-found message.

35. A method as claimed in claim 34 additionally comprising, when said detecting step fails to detect said unit-found message, steps of:

selecting a second one of said discrete cells to use in sending a second incoming-call message to said mobile unit;

sending said second incoming-call message to said mobile unit using said second selected cell; and detecting whether said mobile unit responds to said second incoming-call message with said unit-found message.

* * * * *